United States Patent
Seong et al.

(10) Patent No.: US 11,455,821 B2
(45) Date of Patent: Sep. 27, 2022

(54) ELECTRONIC DEVICE PERFORMING FINGERPRINT AUTHENTICATION AND OPERATION METHOD THEREOF

(71) Applicant: Samsung Electronics Co., Ltd., Suwon-si (KR)

(72) Inventors: Yeolmin Seong, Seoul (KR); Seongwook Song, Seoul (KR); Kiup Kim, Suwon-si (KR); Yoonkyung Choi, Seongnam-si (KR)

(73) Assignee: Samsung Electronics Co., Ltd, Gyeonggi-do (KR)

( * ) Notice: Subject to any disclaimer, the term of this patent is extended or adjusted under 35 U.S.C. 154(b) by 0 days.

(21) Appl. No.: 17/372,942

(22) Filed: Jul. 12, 2021

(65) Prior Publication Data

US 2022/0012449 A1 Jan. 13, 2022

(30) Foreign Application Priority Data

Jul. 13, 2020 (KR) .......................... 10-2020-0086221

(51) Int. Cl.
*G06V 40/13* (2022.01)
*G06F 3/041* (2006.01)
(Continued)

(52) U.S. Cl.
CPC ........ *G06V 40/1306* (2022.01); *G06F 3/0446* (2019.05); *G06F 3/041662* (2019.05);
(Continued)

(58) Field of Classification Search
CPC ......... G06F 3/041–0448; G06F 3/0416; G06F 3/04166–04186; G06V 40/1306; G06V 40/1382–1394
See application file for complete search history.

(56) References Cited

U.S. PATENT DOCUMENTS 7,486,809 B2   2/2009 Hara et al.
9,811,713 B2  11/2017 Pi et al.
(Continued)

FOREIGN PATENT DOCUMENTS

CN   110235144 A  *  9/2019  .......... G06F 3/0414
JP      4013962 B2   11/2007
(Continued)

*Primary Examiner* — Patrick F Marinelli
(74) *Attorney, Agent, or Firm* — Harness, Dickey & Pierce, P.L.C.

(57) ABSTRACT

An electronic device includes a touch panel that includes a plurality of row touch lines and a plurality of column touch lines, a touch driver that controls the plurality of row touch lines and the plurality of column touch lines to obtain secondary biometrics including touch profile information, first indicator information, and second indicator information associated with a fingerprint of a user being in contact with the touch panel, in a fingerprint sensing mode of the electronic device, a fingerprint sensor that obtains fingerprint information about the fingerprint of the user, in the fingerprint sensing mode of the electronic device, an authentication module that performs a fingerprint matching operation and an anti-spoofing operation based on the fingerprint information and the secondary biometrics to output an authentication result, and an application processor that performs a security operation based on the authentication result.

20 Claims, 25 Drawing Sheets

(51) Int. Cl.
*G06F 21/32* (2013.01)
*G06V 40/12* (2022.01)
*G06F 3/044* (2006.01)
*G06V 40/40* (2022.01)

(52) U.S. Cl.
CPC .......... *G06F 21/32* (2013.01); *G06V 40/1365* (2022.01); *G06V 40/1388* (2022.01); *G06V 40/45* (2022.01)

(56) References Cited

U.S. PATENT DOCUMENTS

| | | | |
|---|---|---|---|
| 9,842,245 B1* | 12/2017 | Setterberg | G06V 40/1394 |
| 10,043,048 B2* | 8/2018 | Chiang | G06V 40/1306 |
| 10,282,585 B2 | 5/2019 | Ogirko et al. | |
| 10,318,791 B2* | 6/2019 | He | G06V 40/1306 |
| 10,325,142 B2 | 6/2019 | He et al. | |
| 10,446,455 B2 | 10/2019 | Park et al. | |
| 11,184,766 B1* | 11/2021 | Lord | G06V 40/1365 |
| 2013/0129163 A1 | 5/2013 | Chung et al. | |
| 2018/0082102 A1 | 3/2018 | Lee et al. | |
| 2019/0034020 A1 | 1/2019 | He et al. | |
| 2020/0005010 A1 | 1/2020 | Yeo et al. | |
| 2020/0234022 A1* | 7/2020 | Han | H03K 17/96 |
| 2021/0334492 A1* | 10/2021 | Guo | G06V 40/1306 |
| 2022/0012449 A1* | 1/2022 | Seong | G06F 21/32 |

FOREIGN PATENT DOCUMENTS

| | | |
|---|---|---|
| KR | 10-2005-0051659 A | 6/2005 |
| KR | 10-2007-0099426 A | 10/2007 |
| KR | 10-0914615 B1 | 9/2009 |
| KR | 10-2010-0080762 A | 7/2010 |
| KR | 10-2018-0031511 A | 3/2018 |
| KR | 10-2052697 B1 | 12/2019 |

* cited by examiner

[Good Ground Condition]

[Low Ground Condition #1]

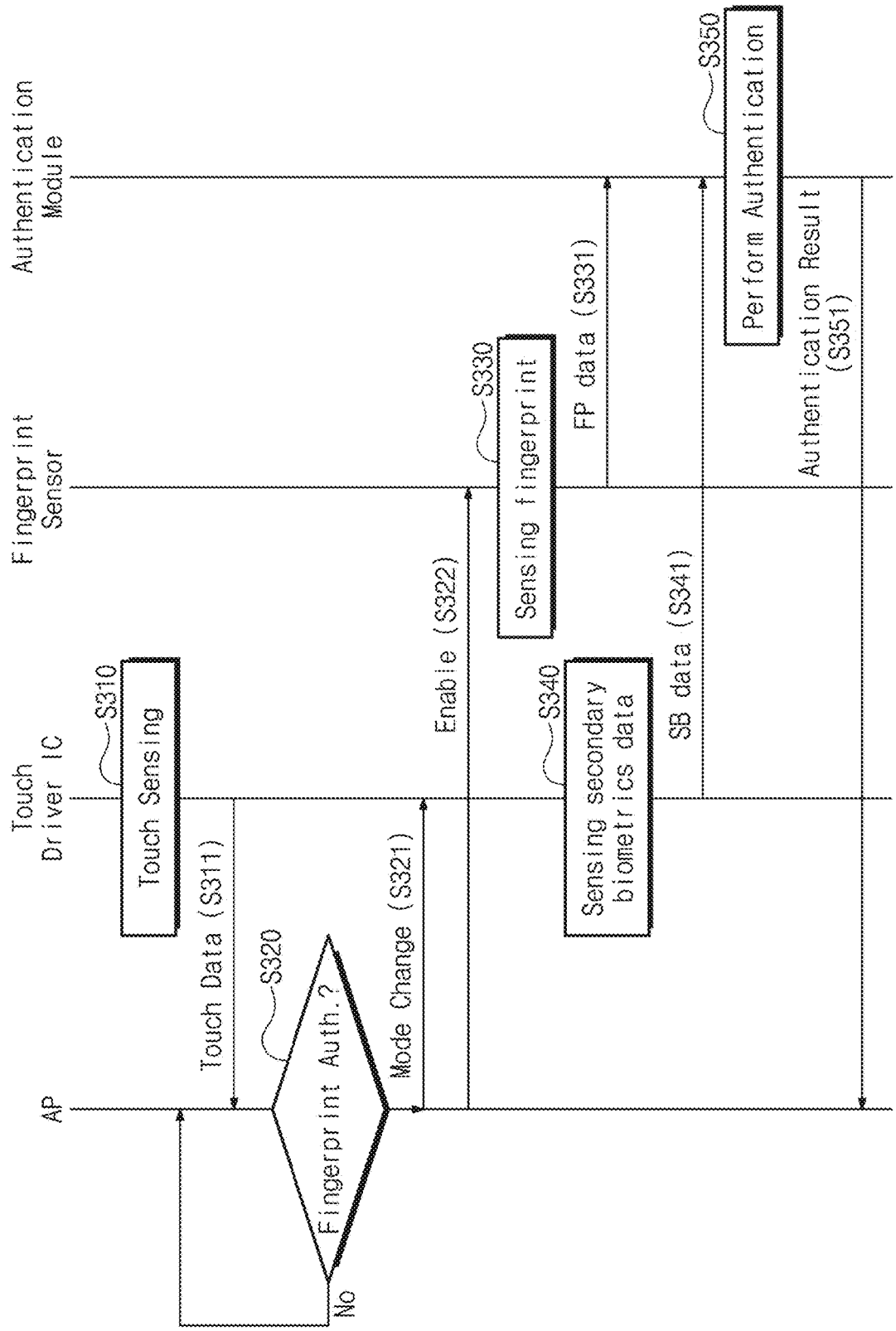

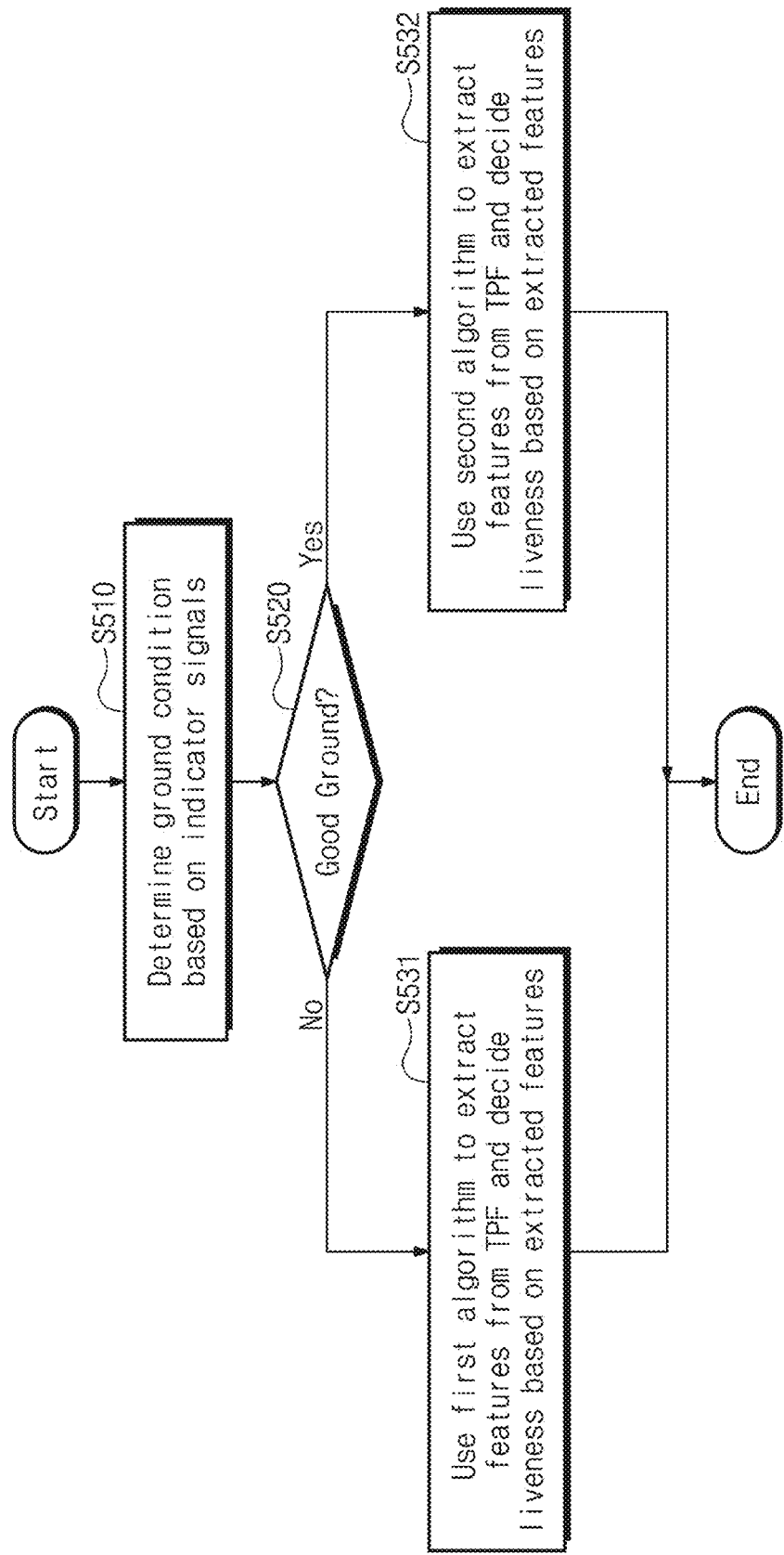

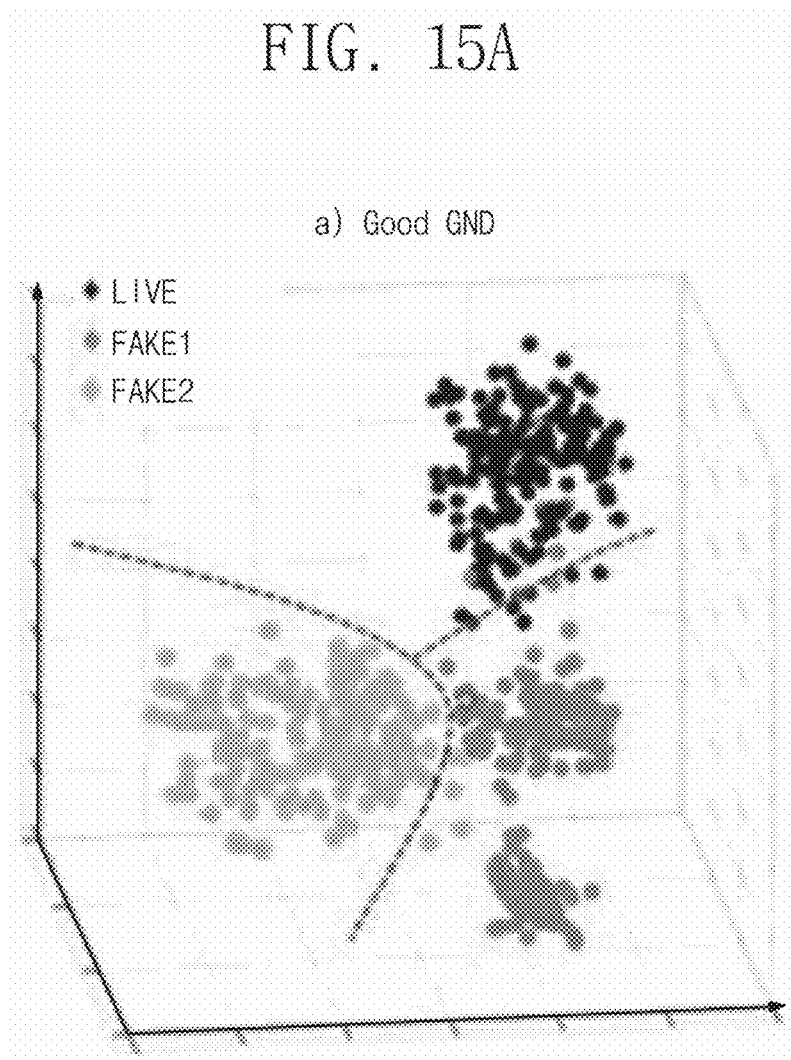

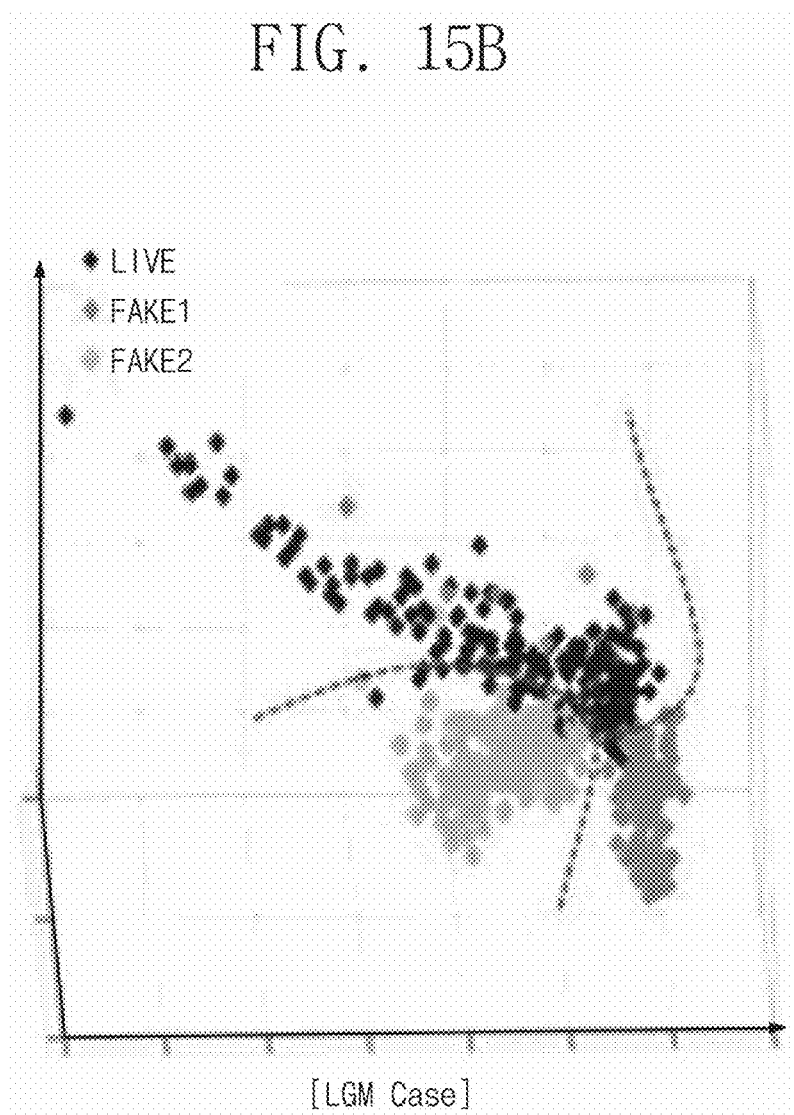

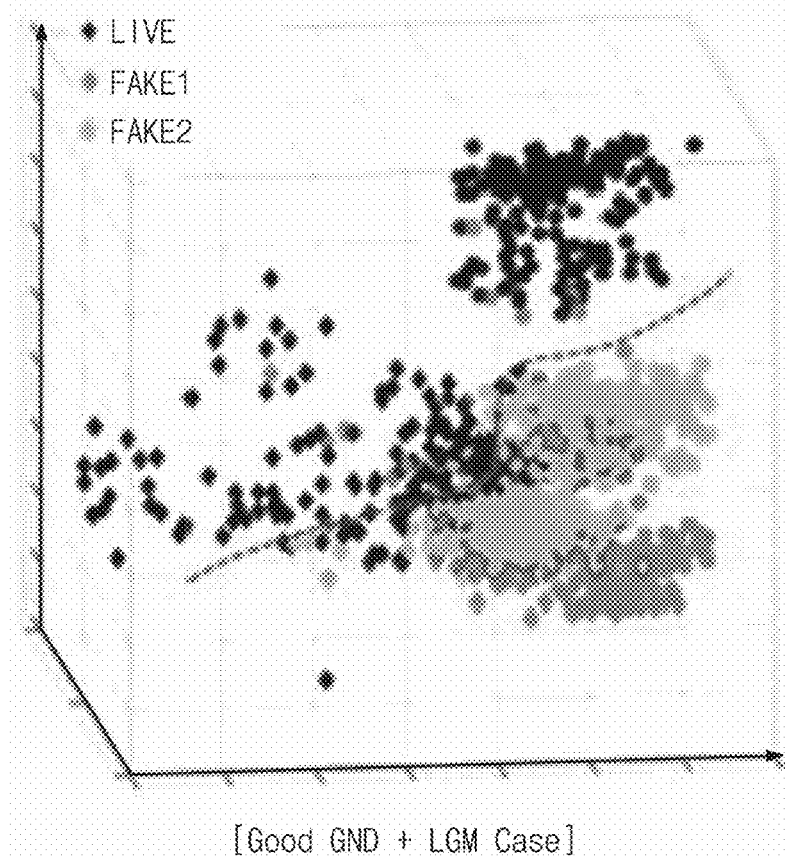

ELECTRONIC DEVICE PERFORMING FINGERPRINT AUTHENTICATION AND OPERATION METHOD THEREOF

CROSS-REFERENCE TO RELATED APPLICATIONS

This application claims priority under 35 U.S.C. § 119 to Korean Patent Application No. 10-2020-0086221 filed on Jul. 13, 2020, in the Korean Intellectual Property Office, the disclosures of which are incorporated by reference herein in their entireties.

BACKGROUND

Example embodiments of the inventive concepts described herein relate to an electronic device. For example, at least some example embodiments relate to an electronic device performing fingerprint authentication and/or an operation method thereof.

Recent electronic devices provide various functions depending on operations of various electronic circuits/modules/chips included therein. Electronic devices such as a computer, a smartphone, a tablet, and the like include electronic circuits, modules, or chips for the purpose of providing various functions.

Nowadays, as the security of an electronic device becomes more important, the electronic device performs various user authentication functions for providing a service to an authenticated user. For example, fingerprint detection and recognition is one of user authentication functions being widely used. The electronic device may provide a user authentication function of detecting a user fingerprint and determining whether the detected user fingerprint is matched with an authentication fingerprint stored in advance. However, as a technique for faking a fingerprint develops, user authentication may be performed through a faked fingerprint. Accordingly, there is required a technique for preventing a fingerprint from being faked, for example, a technique such as anti-spoofing.

SUMMARY

Example embodiments of the inventive concepts provide an electronic device with improved reliability and/or an operation method thereof.

According to an example embodiment, an electronic device configured to perform fingerprint authentication may include a touch panel including a plurality of row touch lines and a plurality of column touch lines; a touch driver configured to control the plurality of row touch lines and the plurality of column touch lines to obtain secondary biometrics including touch profile information, first indicator information, and second indicator information associated with a fingerprint of a user, in response to the electronic device operating in a fingerprint sensing mode; a fingerprint sensor configured to obtain fingerprint information from the fingerprint of the user, in response to the electronic device operating in the fingerprint sensing mode; and processing circuitry configured to, perform a fingerprint matching operation and an anti-spoofing operation based on the fingerprint information and the secondary biometrics to output an authentication result, and perform a security operation based on the authentication result.

According to an example embodiment, a method of operating an electronic device to perform fingerprint authentication may include: controlling a plurality of row touch lines and a plurality of column touch lines to sense a touch of a user, in response to the electronic device operating in a normal mode; obtaining fingerprint information from a fingerprint of the user, in response to the electronic device operating in a fingerprint sensing mode; controlling the plurality of row touch lines and the plurality of column touch lines to obtain secondary biometrics including touch profile information, first indicator information, and second indicator information associated with the fingerprint of the user, in response to the electronic device operating in the fingerprint sensing mode; performing a fingerprint matching operation and an anti-spoofing operation based on the fingerprint information, the touch profile information, the first indicator information, and the second indicator information to generate an authentication result, in response to the electronic device operating in the fingerprint sensing mode; and performing a security operation based on the authentication result.

According to an example embodiment, an electronic device configured to perform fingerprint authentication, the electronic device comprising: a touch panel including a plurality of touch lines extending along a row direction and a column direction; a touch driver configured to, in response to the electronic device operating in a normal mode, control the plurality of touch lines based on a first driving scheme and a second driving scheme to sense a touch of a user, and in response to the electronic device operating in a fingerprint sensing mode, control the plurality of touch lines based on the first driving scheme to obtain touch profile information, control the plurality of touch lines based on the second driving scheme to obtain first indicator information, and control the plurality of touch lines based on a third driving scheme to obtain second indicator information; a fingerprint sensor configured to obtain fingerprint information from the fingerprint of the user, in response to the electronic device operating in the fingerprint sensing mode; and an application processor configured to perform, a fingerprint matching operation and an anti-spoofing operation on the fingerprint information and secondary biometrics, and perform a security operation in response to results of the fingerprint matching operation and the anti-spoofing operation.

According to an example embodiment, a method of operating a touch driver to control a touch panel including a plurality of touch lines extending along a row direction and a column direction includes in response to the touch driver operating in a touch sensing mode, controlling the plurality of touch lines based on a mutual-cap driving scheme to generate first touch data; controlling the plurality of touch lines based on a first self-cap driving scheme to generate second touch data, the first self-cap driving scheme being a scheme in which a phase of a first touch signal provided to touch lines extending in the row direction from among the plurality of touch lines is same as a phase of a second touch signal provided to touch lines extending to the column direction from among the plurality of touch lines. Further, in response to the touch driver operating in a fingerprint sensing mode, the method includes controlling the plurality of touch lines based on the mutual-cap driving scheme to generate a touch profile; controlling the plurality of touch lines based on the first self-cap driving scheme to generate first indicator information; and controlling the plurality of touch lines based on a second self-cap driving scheme to generate second indicator information, the second self-cap driving scheme being a scheme in which a phase of a third touch signal provided to the touch lines extending in the row direction is reverse to a phase of a fourth touch signal provided to the touch lines extending to the column direction.

BRIEF DESCRIPTION OF THE FIGURES

The above and other objects and features of the inventive concepts will become apparent by describing in detail example embodiments thereof with reference to the accompanying drawings.

FIG. 12 is a diagram illustrating an operation of an electronic device of FIG. 1.

FIG. 14 is a flowchart illustrating an anti-spoofing operation of an authentication module.

FIGS. 15A to 15C are graphs for describing an anti-spoofing operation of an authentication module of FIG. 14.

DETAILED DESCRIPTION

Below, example embodiments of the inventive concepts may be described in detail and clearly to such an extent that an ordinary one in the art easily implements the inventive concepts.

Figure 1:
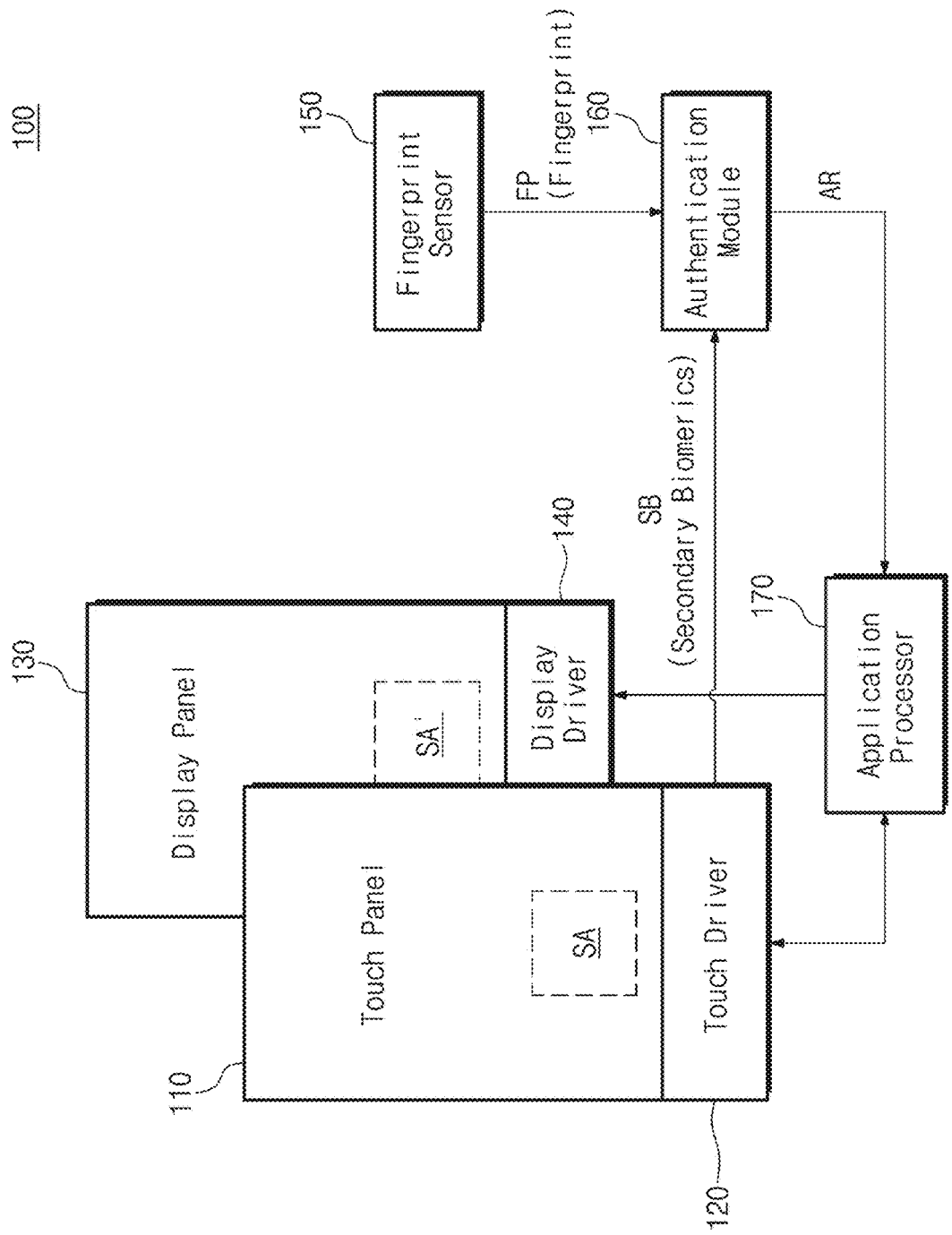
FIG. 1 is a block diagram illustrating an electronic device according to an example embodiment of the inventive concepts.
Figure 2:
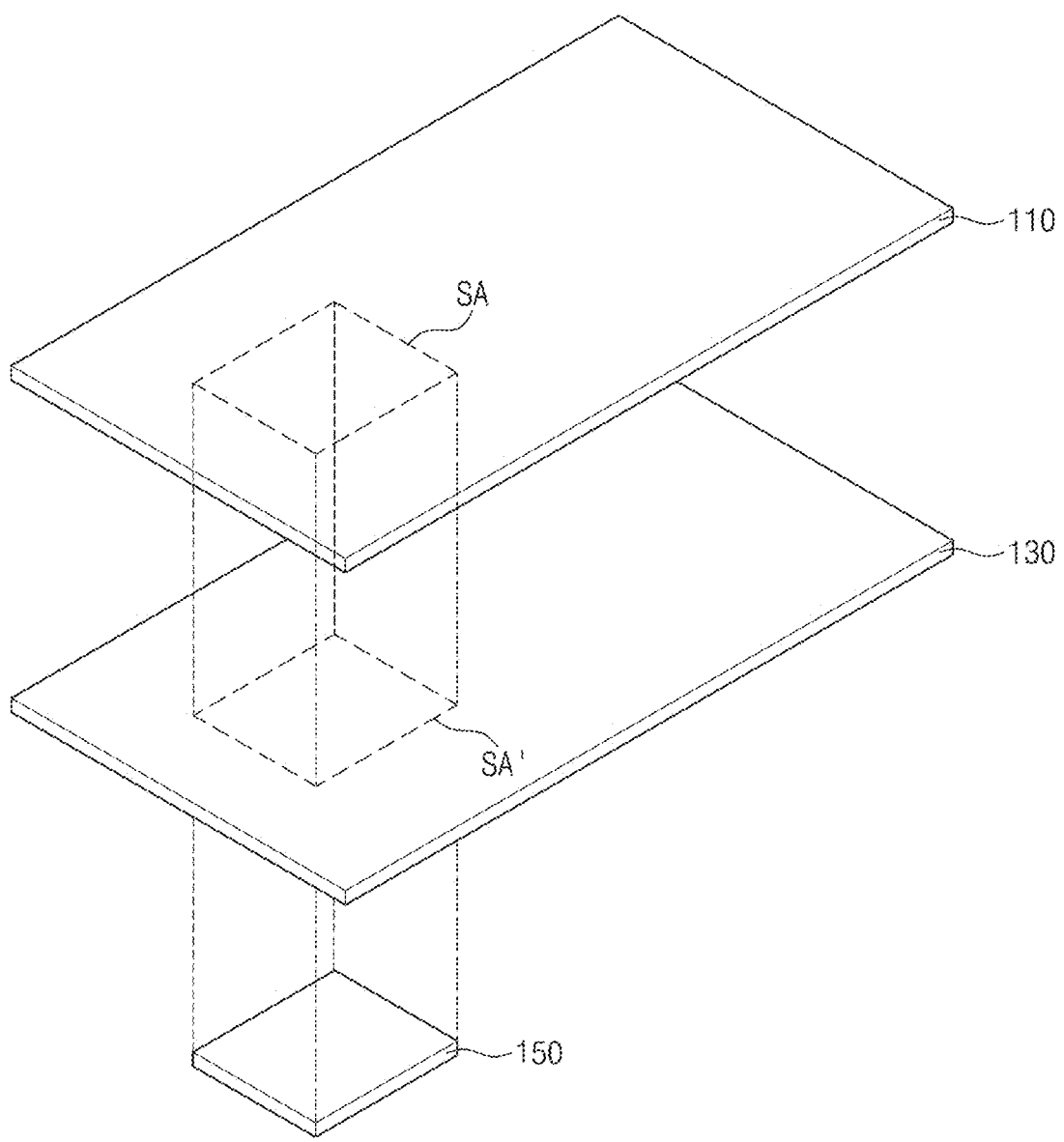
FIG. 2 is a diagram illustrating a touch panel, a display panel, and a fingerprint sensor of FIG. 1.

FIG. 1 is a block diagram illustrating an electronic device according to an example embodiment of the inventive concepts. FIG. 2 is a diagram illustrating a touch panel, a display panel, and a fingerprint sensor of FIG. 1. Referring to FIGS. 1 and 2, an electronic device 100 may include a touch panel 110, a touch driver 120, a display panel 130, a display driver 140, a fingerprint sensor 150, an authentication module 160, and an application processor 170. In an example embodiment, the electronic device 100 may be one of various electronic devices such as a portable communication terminal, a personal digital assistant (PDA), a portable media player (PMP), a digital camera, a smartphone, a tablet computer, a laptop computer, and a wearable device.

In some example embodiments, the authentication module 160 and the application processor 170 may be implemented by processing circuitry such as hardware including logic circuits; a hardware/software combination such as a processor executing software; or a combination thereof. For example, the processing circuitry may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc.

The touch panel 110 and the touch driver 120 may be configured to sense a touch input from a user. For example, the touch panel 110 may include a plurality of touch lines. The plurality of touch lines may be arranged in a row direction and a column direction. The touch driver 120 may control voltages of the plurality of touch lines of the touch panel 110 and may sense a user touch based on signal changes of the plurality of touch lines.

The display panel 130 may include a plurality of pixels for displaying image information to the outside. Each of the plurality of pixels may be an organic light-emitting diode (OLED) pixel, but the inventive concepts is not limited thereto. Under control of the display driver 140, the display panel 130 may display image information or may allow each pixel of a specific area to emit a light. The display driver 140 may be configured to control the display panel 130 under control of the application processor 170 or any other graphic processing unit (GPU).

In an example embodiment, the description is given as the touch driver 120 and the display driver 140 are implemented with separate hardware components, but the inventive concepts is not limited thereto. For example, each of the touch driver 120 and the display driver 140 may be implemented with a separate semiconductor chip, a separate semiconductor device, a separate semiconductor package, or the like, or the touch driver 120 and the display driver 140 may be implemented with one semiconductor chip, one semiconductor device, one semiconductor package, or the like.

An example embodiment is illustrated in FIG. 1 as the touch panel 110 and the display panel 130 are separated from each other, but the inventive concepts is not limited thereto. For example, the display panel 130 may be formed on one semiconductor substrate, and the touch panel 110 may be formed on the display panel 130. Alternatively, the display panel 130 and the touch panel 110 may be formed in the same process. That is, the display panel 130 and the touch panel 110 may be implemented in an on-cell type or an in-cell type. Alternatively, the display panel 130 and the touch panel 110 may be variously implemented in different types.

The fingerprint sensor 150 may be configured to detect a fingerprint of the user. In an example embodiment, the fingerprint sensor 150 may be an optical fingerprint sensor, but the inventive concepts is not limited thereto. For example, the fingerprint sensor 150 may be implemented with an optical sensor, an ultrasonic sensor, or a capacitive sensor. Below, for convenience of description, it is assumed that the fingerprint sensor 150 is an optical fingerprint sensor.

In an example embodiment, the fingerprint sensor 150 may be implemented with a fingerprint on display (FoD). For example, the fingerprint sensor 150 may be formed under the touch panel 110 and the display panel 130. In this case, as illustrated in FIG. 2, the touch panel 110 and the display panel 130 may be disposed such that a fingerprint sensing area SA of the touch panel 110 is aligned with a fingerprint sensing area SA' of the display panel 130. The fingerprint sensor 150 may be disposed under the display panel 130 such that the fingerprint sensing area SA of the touch panel 110 is aligned with the fingerprint sensing area SA' of the display panel 130. When the user touches the fingerprint sensing area SA or SA' with his/her finger, the fingerprint sensor 150 may obtain information about a fingerprint of the user's finger (for convenience of description, hereinafter referred to as "fingerprint information FP"). The fingerprint information FP may be provided to the authentication module 160.

The authentication module 160 may perform user authentication based on the fingerprint information FP provided from the fingerprint sensor 150. In this case, the authentication module 160 may determine whether the fingerprint information FP is faked, based on secondary biometrics SB provided from the touch driver 120 (e.g., may perform an anti-spoofing operation).

Conventionally, user authentication may be permitted by a false fingerprint. For example, a fingerprint of the user may be faked through various materials such as silicon, rubber, film, paper, and gelatin, and false fingerprint information obtained using the fingerprint sensor 150 from the false fingerprint may be identical to fingerprint information about a real fingerprint of the user.

In contrast, in one or more example embodiments, to determine whether the fingerprint of the user is faked, the authentication module 160 may use the secondary biometrics SB. The secondary biometrics SB may include information about a capacitance associated with an object (including the above materials or the finger of the user) being in contact with the touch panel 110 or information about the variation in capacitance due to the object. For example, in the case where a finger of a real human is in contact with the fingerprint sensing area SA of the touch panel 110, a capacitance may change at the touch panel 110 due to the finger of the real human. In contrast, in the case where various fake materials such as silicon, rubber, film, paper, and gelatin are in contact with the fingerprint sensing area SA of the touch panel 110, a capacitance may not change at the touch panel 110, or the variation in capacitance due to a fake material may be different from the variation in capacitance due to a finger of a human.

That is, the authentication module 160 may detect a capacitance change through the touch panel 110 at a time when the fingerprint information FP is obtained and may decide liveness of the fingerprint based on the detected capacitance change. In an example embodiment, the authentication module 160 may perform machine learning based on the fingerprint information FP and the secondary biometrics SB; based on a result of the machine learning, the authentication module 160 may determine whether a fingerprint is faked and may perform user authentication (i.e., may perform fingerprint matching). An authentication result AR that is based on a result of the authentication operation (i.e., fingerprint matching and fake determination) performed by the authentication module 160 may be provided to the application processor 170.

In an example embodiment, the authentication module 160 may be implemented with separate hardware. Alternatively, the authentication module 160 may be included in the fingerprint sensor 150 or the application processor 170. Alternatively, the authentication module 160 may be implemented in the form of software and may be driven by the application processor 170. However, the inventive concepts is not limited thereto. For example, the authentication module 160 may be implemented in various forms.

The application processor 170 may perform various operations based on the authentication result AR. For example, the application processor 170 may perform various security operations of the electronic device 100, such as unlock, financial payment, and an access to a secure area, based on the authentication result AR.

In an example embodiment, the above secondary biometrics SB that the authentication module 160 uses may include touch profile information, first indicator information, and second indicator information. In the case of sensing a fingerprint, the touch profile information indicates touch information collected from a touch of the user by the touch panel 110, and the first and second indicator information indicates information for detecting a ground state of the user. In an example embodiment, the first and second indicator information may be obtained or collected from the plurality of touch lines of the touch panel 110 by an operation of the touch driver 120.

As described above, the authentication module 160 according to the inventive concepts may determine whether a fingerprint is faked, by using the secondary biometrics SB. In this case, according to the inventive concepts, the secondary biometrics SB that are used to determine whether a fingerprint is faked may include information (i.e., the first and second indicator information) capable of determining a ground state of the user, as well as a change of a capacitance due to a touch of the user. In this case, even though the variation in capacitance changes depending on a ground state of the user, the authentication module 160 may perform normal fake determination, and thus, the security and reliability of the electronic device 100 may be improved. Below, organization of the secondary biometrics SB, a configuration for obtaining the secondary biometrics SB, and a fake determination operation using the secondary biometrics SB, which are capable of being implemented according to an example embodiment of the inventive concepts, will be more fully described with reference to drawings.

Figure 3:
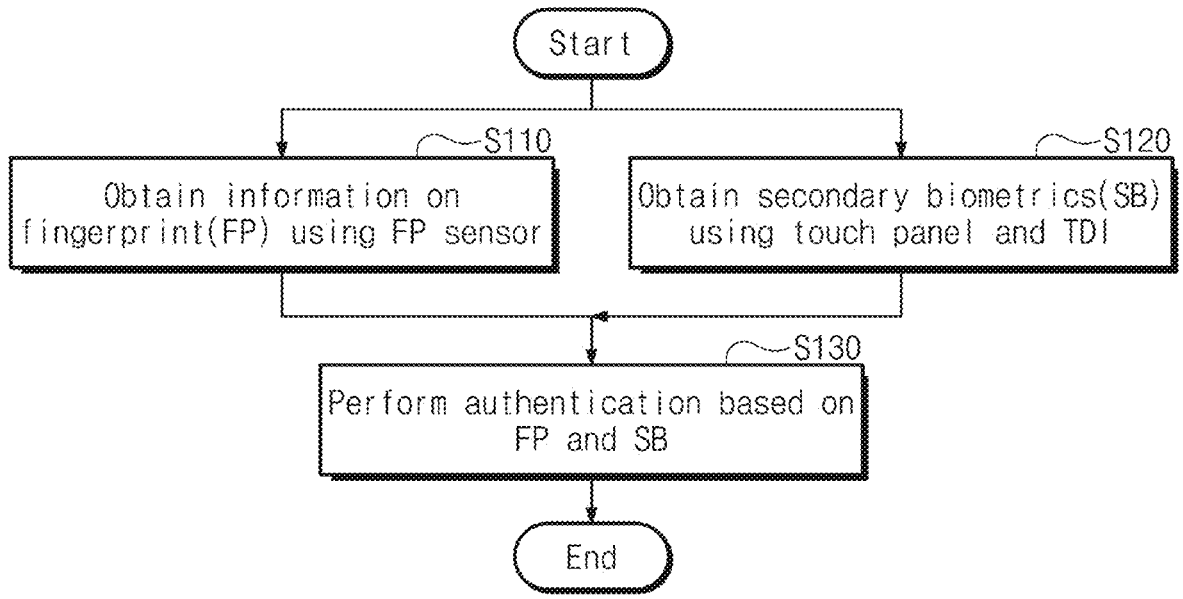
FIG. 3 is a flowchart illustrating an operation of an electronic device of FIG. 1.

FIG. 3 is a flowchart illustrating an operation of an electronic device of FIG. 1. Referring to FIGS. 1 and 3, in operation S110, the electronic device 100 may obtain the fingerprint information FP about an object (e.g., a false fingerprint or a real fingerprint of the user) being in contact with the electronic device 100 using the fingerprint sensor 150.

In operation S120, the electronic device 100 may obtain the secondary biometrics SB by using the touch panel 110 and the touch driver 120. For example, by controlling the plurality of touch lines included in the touch panel 110, the touch driver 120 may obtain a variety of information (e.g., the touch profile information, the first indicator information, and the second indicator information) about a change of a capacitance due to the object (e.g., a false fingerprint or a real fingerprint of the user) being in contact with the electronic device 100.

In operation S130, the electronic device 100 may perform an authentication operation (e.g., fingerprint matching and liveness determination) based on the fingerprint information FP and the secondary biometrics SB. For example, the authentication module 160 of the electronic device 100 may perform a fingerprint matching operation of determining whether the fingerprint information FP collected from the fingerprint sensor 150 is matched with fingerprint information registered in advance. When a result of the fingerprint matching operation is determined as successful, the authentication module 160 may perform an anti-spoofing operation of determining whether a source of the collected fingerprint information FP is a finger of a real human or any other material, based on the secondary biometrics SB, that is, may determine whether a false fingerprint is detected, based on the secondary biometrics SB. In an example embodiment, the authentication module 160 may perform the fingerprint matching operation and the anti-spoofing operation individually, simultaneously, or in parallel based on the machine learning.

Figure 4:
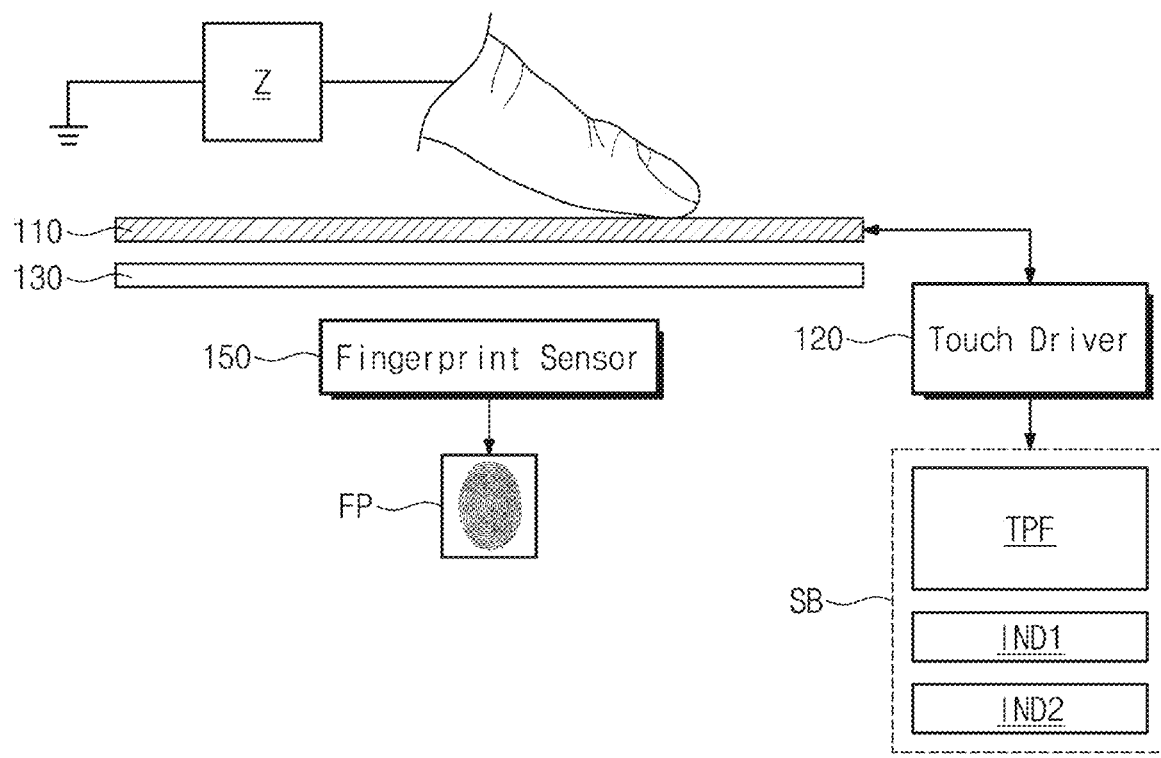
FIG. 4 is a diagram illustrating an electronic device of FIG. 1.

FIG. 4 is a diagram illustrating an electronic device of FIG. 1. For brevity of drawing, components that are not directly related to obtaining information (e.g., the fingerprint information FP and the secondary biometrics SB) for fingerprint recognition are omitted in FIG. 4.

Referring to FIGS. 1 and 4, the electronic device 100 may include the touch panel 110, the touch driver 120, the display panel 130, and the fingerprint sensor 150. The components 110, 120, 130, and 150 of FIG. 4 are described above, and thus, additional description will be omitted to avoid redundancy.

Below, for convenience of description, it is assumed that a component being in contact with an upper surface of the touch panel 110 or the electronic device 100 in a fingerprint recognition process is a finger of the user. However, the inventive concepts is not limited thereto. For example, a component being in contact with the upper surface of the touch panel 110 or the electronic device 100 may be any other fake material(s) as well as a finger of the user. In this case, a fake fingerprint may be determined by the anti-spoofing operation according to the inventive concepts.

In the case where a finger of the user contacts the upper surface of the touch panel 110, the fingerprint sensor 150 may collect the fingerprint information FP from the user's finger being in contact with the upper surface of the touch panel 110, and the touch driver 120 may drive the plurality of touch lines of the touch panel 110 to collect the secondary biometrics SB.

The secondary biometrics SB may include touch profile information TPF, first indicator information IND1, and second indicator information IND2. The touch profile information TPF may indicate touch information about the user's finger put on the touch panel 110. In an example embodiment, the touch profile information TPF may be information collected from the touch panel 110 based on a first driving scheme. In an example embodiment, the first driving scheme may indicate a mutual capacitive (mutual-cap) driving scheme.

The first indicator information IND1 and the second indicator information IND2 may be information for determining a ground state of the user at the time when a finger of the user makes contact with the touch panel 110. For example, the ground state of the user may be expressed by an impedance "Z" of a user's body. The ground state of the user, that is, the impedance "Z" of the user's body may vary depending on a location of the electronic device 100, whether the electronic device 100 is in contact with the user, and the like.

In detail, in the case where only a finger of the user contacts the upper surface of the electronic device 100, a ground of the electronic device 100 and a ground of the user may be different. In the case where the ground of the electronic device 100 and the ground of the user are different, the ground state of the user may be expressed as bad. Below, the case where the ground state of the user is bad is referred to as a "low ground state (Low GND)".

Alternatively, in the case where a finger of the user contacts an upper surface of the electronic device 100 and a portion of the user's body contacts a housing or any other portion of the electronic device 100, a ground of the electronic device 100 and a ground of the user may be identical. In the case where the ground of the user and the ground of the electronic device 100 are identical, the ground state of the user may be expressed as good. Below, the case where the ground state of the user is good is referred to as a "good ground state (Good GND)".

Touch profile information of the good ground state and touch profile information of the low ground state may be different in form. That is, in the case where anti-spoofing is performed simply based on touch profile information or a capacitance change of a touch panel, even though a real finger of the user is in contact with the touch panel 110, an anti-spoofing result may vary depending on a ground state of the user. That is, reliability of false fingerprint determination may be reduced depending on a ground state of the user.

According to an example embodiment of the inventive concepts, as described above, the secondary biometrics SB may include the first and second indicator information IND1 and IND2, and the first and second indicator information IND1 and IND2 may be used to determine a ground state of the user. For example, the first indicator information IND1 may have a value that is variable depending on a ground state of the user, and the second indicator information IND2 may have a value that is relatively uniform regardless of a ground state of the user. That is, a ground state of the user may be determined based on the first and second indicator information IND1 and IND2, and the ground state of the user may be used in the anti-spoofing operation. Accordingly, because a ground state of the user is also considered in the anti-spoofing operation, reliability of false fingerprint determination may be improved.

In an example embodiment, the first indicator information IND1 may be collected from the touch panel 110 driven in a second driving scheme, and the second indicator information IND2 may be collected from the touch panel 110 driven in a third driving scheme. In an example embodiment, the second driving scheme may indicate a first self-cap driving scheme, and the third driving scheme may indicate a second self-cap driving scheme using a reverse phase signal with respect to touch lines of the touch panel 110. In an example embodiment, the first self-cap driving scheme may indicate a driving scheme to provide touch signals of the same phase and the same frequency to row touch lines and column touch lines, and the second self-cap driving scheme may indicate a driving scheme to provide a first touch signal to each row touch line and provide a second touch signal, a phase of which is reverse to that of the first touch signal, to each column touch line. The first and second self-cap driving schemes may be similar except that a phase of a touch signal provided to a row touch line and a phase of a touch signal provided to a column touch line.

Operations and configurations for collecting the touch profile information TPF, the first indicator information IND1, and the second indicator information IND2 described above will be more fully described with reference to FIGS. 5 to 11C.

Figure 5:
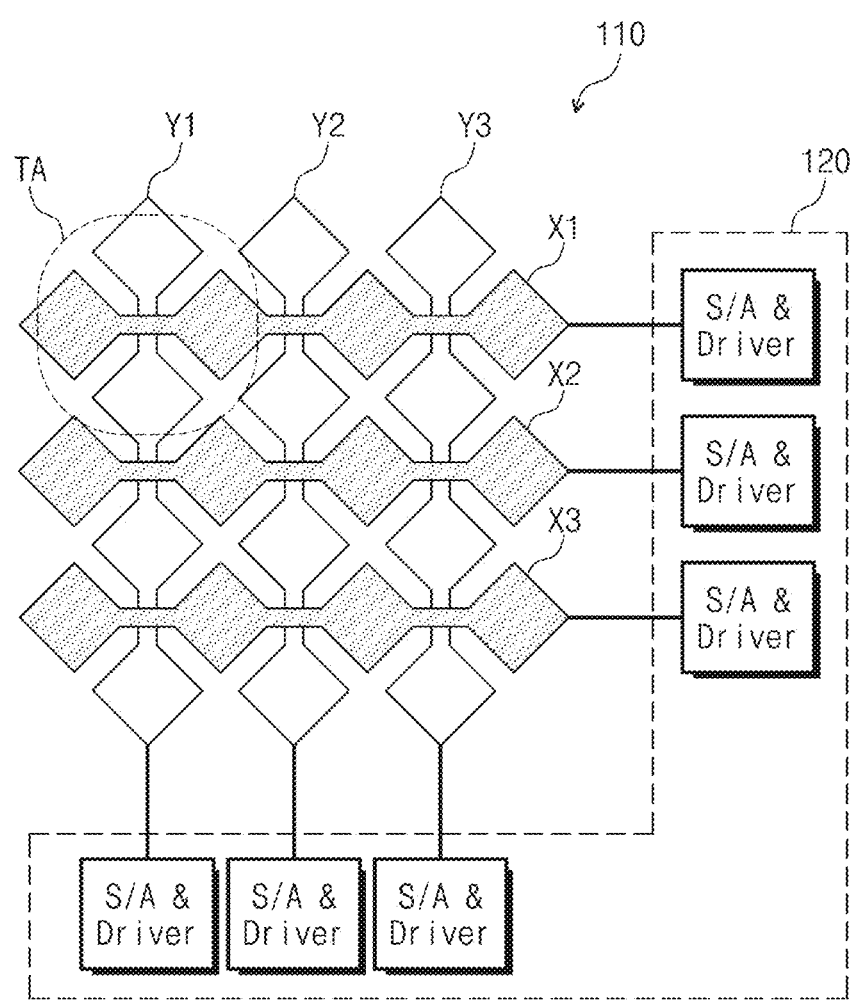
FIG. 5 is a diagram illustrating a touch panel and a touch driver of FIG. 1.

FIG. 5 is a diagram illustrating a touch panel and a touch driver of FIG. 1. For brevity of drawing, components that are not directly related to drive touch lines of the touch panel 110 are omitted, but the touch driver 120 may further include any other components.

Referring to FIGS. 1 and 5, the touch panel 110 may include a plurality of touch lines X1 to X3 and Y1 to Y3. The plurality of touch lines X1 to X3 and Y1 to Y3 may be implemented with a transparent electrode such as indium tin oxide (ITO), but the inventive concepts is not limited thereto.

The plurality of touch lines X1 to X3 and Y1 to Y3 may be arranged in the row direction and the column direction. For example, each of the first to third row touch lines X1 to X3 may be extended along the row direction, and the first to row third touch lines X1 to X3 may be arranged along the column direction. Each of the first to third column touch lines Y1 to Y3 may be extended along the column direction, and the first to third column touch lines Y1 to Y3 may be arranged along the row direction. An example is illustrated in FIG. 5 as the plurality of touch lines X1 to X3 and Y1 to Y3 are arranged along three rows and three columns, but the inventive concepts is not limited thereto. For example, the number of touch lines may be variously changed or modified.

As illustrated in FIG. 5, the plurality of touch lines X1 to X3 and Y1 to Y3 may be disposed to overlap each other. Each of the plurality of touch lines X1 to X3 and Y1 to Y3 may be connected with a sense amplifier and driver S/A & Driver and may be driven under control of the touch driver 120.

For example, in the case where a touch area TA is touched with a finger of the user, capacitances formed between the first row touch line X1, the first column touch line Y1, and the user's finger may change, and the sense amplifier and driver S/A & Driver of the touch driver 120 may sense the variation in a capacitance through each of the first row touch line X1 and the first column touch line Y1. In an example embodiment, a scheme to sense the variation in a capacitance may include the mutual-cap driving scheme or the self-cap driving scheme, but the inventive concepts is not limited thereto.

Figure 6:
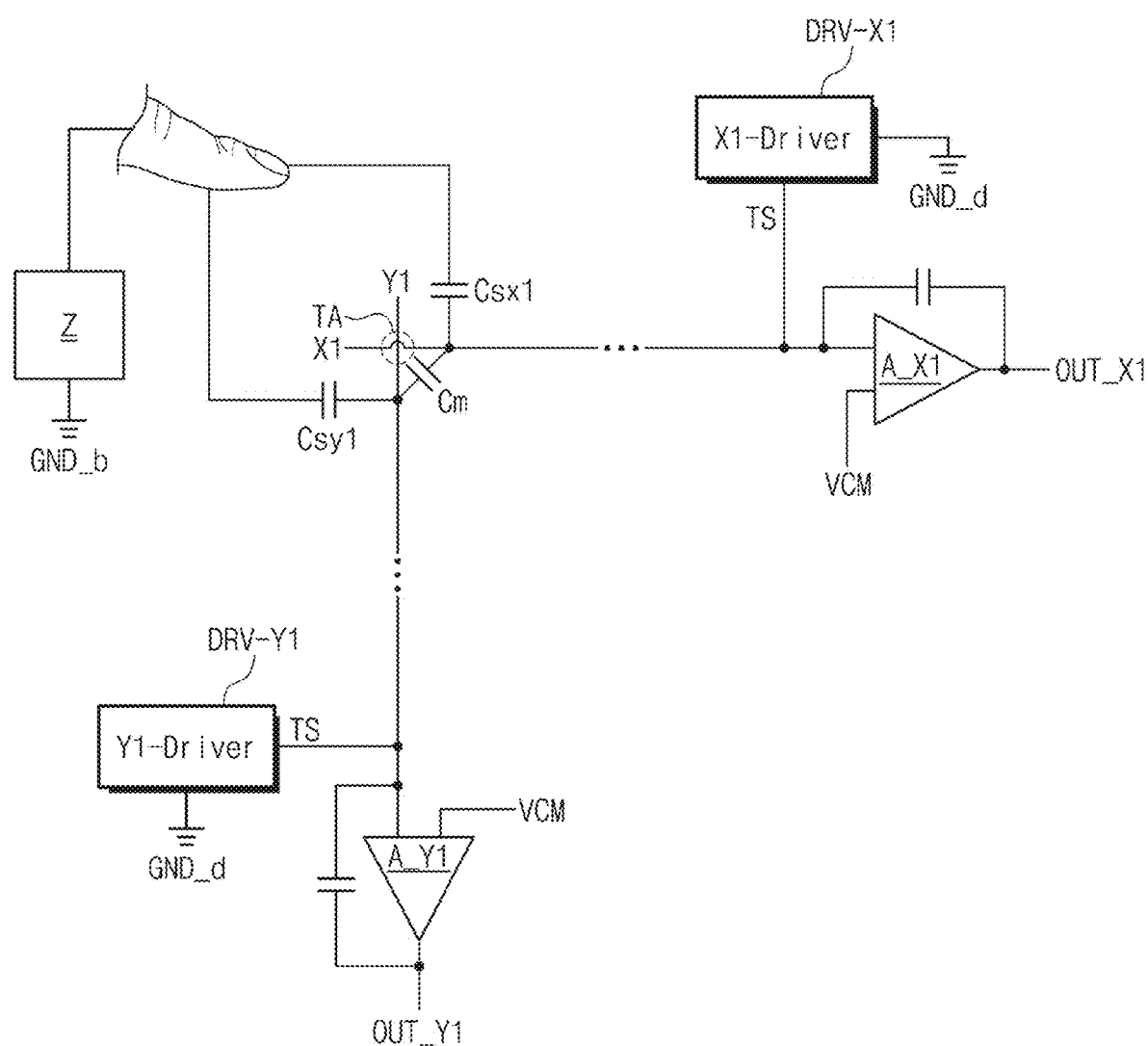
FIG. 6 is a diagram illustrating a circuit configuration of a touch panel and a touch driver of FIG. 5.

FIG. 6 is a diagram illustrating a circuit configuration of a touch panel and a touch driver of FIG. 5. For brevity of drawing, only components associated with the first row touch line X1 and the first column touch line Y1 are illustrated in FIG. 6. Referring to FIGS. 1, 5, and 6, the first row touch line X1 may be extended along the row direction, and the first column touch line Y1 may be extended along the column direction. The first row touch line X1 and the first column touch line Y1 may cross each other at a specific area.

In an example embodiment, because the first row touch line X1 and the first column touch line Y1 are formed of a conductive material, a capacitance (e.g., a mutual capacitance Cm) may be formed between the first row touch line X1 and the first column touch line Y1. In the case where a finger of the user makes contact with the area (i.e., the touch area TA) where the first row touch line X1 and the first column touch line Y1 cross each other, a first row self-capacitance Csx1 may be formed between the user's finger and the first row touch line X1, and a first column self-capacitance Csy1 may be formed between the user's finger and the first column touch line Y1.

A first row amplifier A_X1 may compare a signal of the first row touch line X1 with a reference signal VCM, may amplify a result of the comparison, and may output a first row output signal OUT_X1. A capacitor may be connected between an output terminal and an input terminal of the first row amplifier A_X1. A first row driver DRV_X1 may be configured to control a voltage level of the first row touch line X1 or to provide a touch signal TS to the first row touch line X1.

A first column amplifier A_Y1 may compare a signal of the first column touch line Y1 with the reference signal VCM, may amplify a result of the comparison, and may output a first column output signal OUT_Y1. A capacitor may be connected between an output terminal and an input terminal of the first column amplifier A_Y1. A first column driver DRV_Y1 may be configured to control a voltage level of the first column touch line Y1 or to provide the touch signal TS to the first column touch line Y1.

Figure 7A:
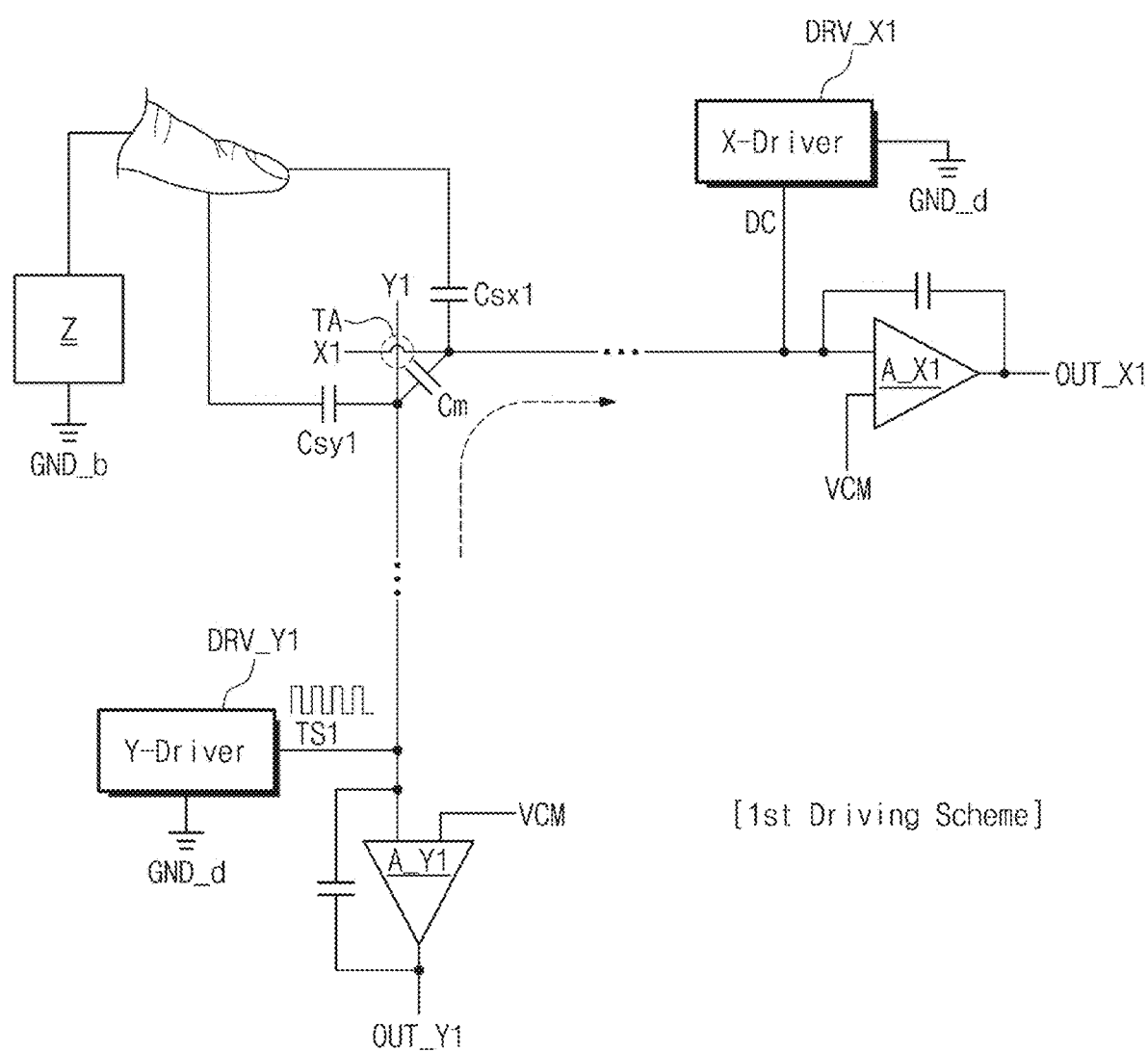
FIGS. 7A to 7C are diagrams for describing driving schemes of a touch driver.
Figure 7B:
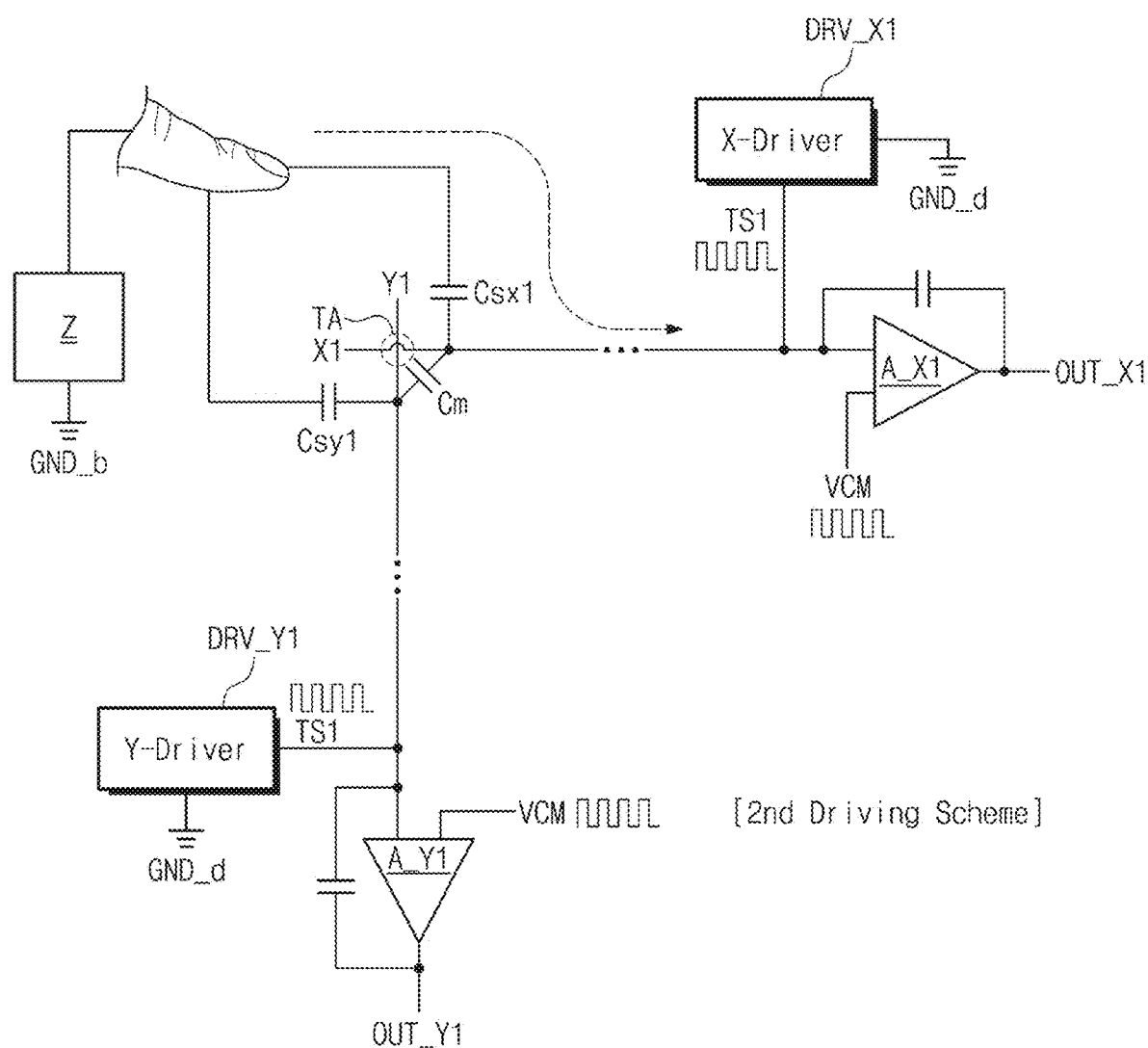
Figure 7C:
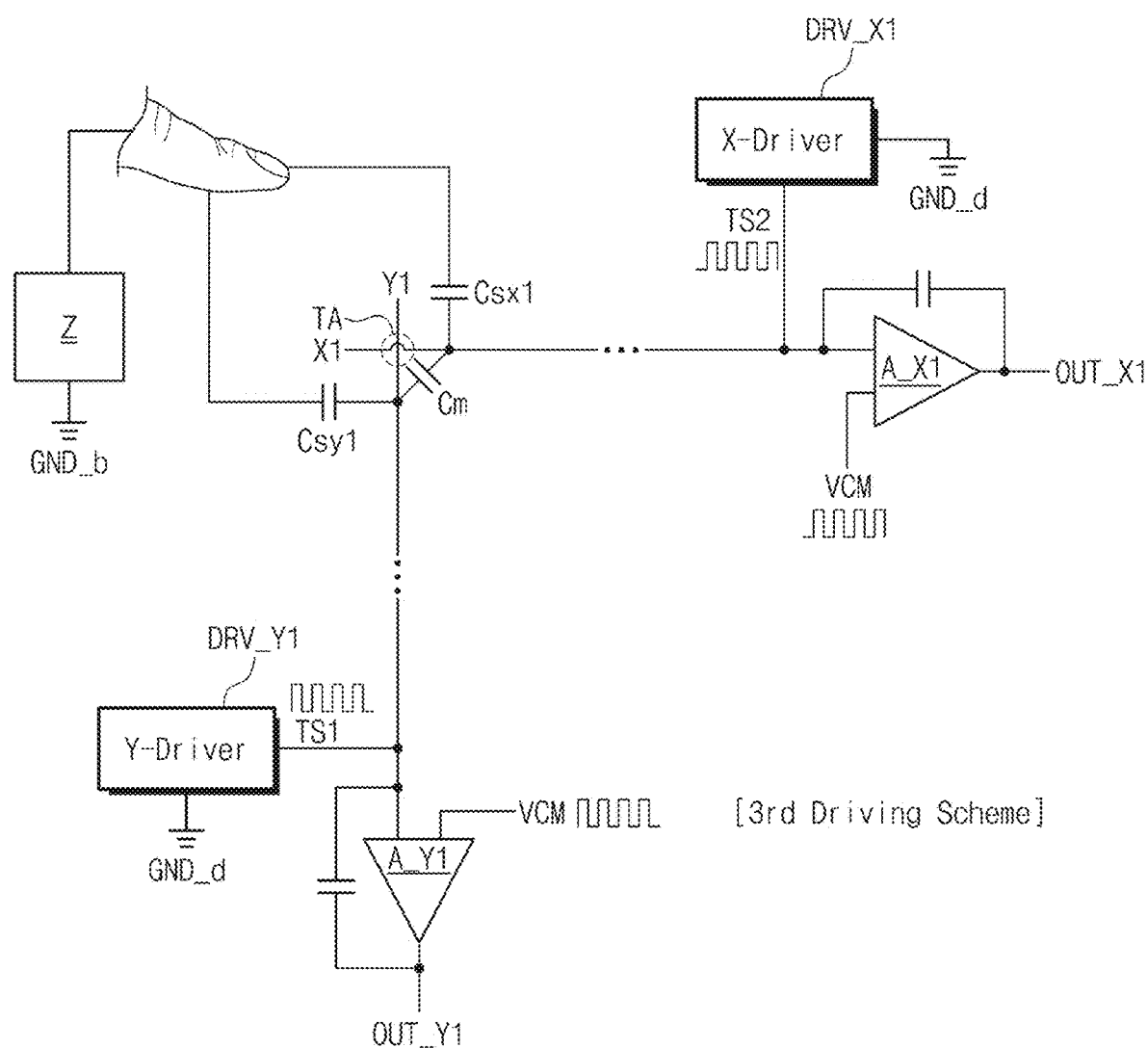

FIGS. 7A to 7C are diagrams for describing driving schemes of a touch driver. For convenience of description, components described above are omitted, and a driving scheme of the touch driver 120 will be described on the basis of the touch lines X1 and Y1, the amplifiers A_X1 and A_Y1, and the drivers DRV_X1 and DRV_Y1 described with reference to FIG. 6. In an example embodiment, the first driving scheme, that is, the mutual-cap driving scheme will be described with reference to FIG. 7A, the second driving scheme, that is, the first self-cap driving scheme will be described with reference to FIG. 7B, and the third driving scheme, that is, the second self-cap driving scheme will be described with reference to FIG. 7C.

First of all, referring to FIGS. 1 and 7A, in the first driving scheme (e.g., the mutual-cap driving scheme), the first row driver DRV_X1 may provide a voltage DC of a uniform level to the first row touch line X1, and the first column driver DRV_Y1 may provide a first touch signal TS1 to the first column touch line Y1. In an example embodiment, the first touch signal TS1 may be a signal that has a uniform frequency and toggles within a range of given voltage levels.

A finger of the user may make contact with the touch area TA where the first row touch line X1 and the first column touch line Y1 cross each other. In this case, the first mutual capacitance Cm formed between the first column touch line Y1 and the first row touch line X1 may change due to the user touch, and the variation in the first mutual capacitance Cm may be sensed by the first row amplifier A_X1. The sensed variation may be output as the first row output signal OUT_X1. The touch driver 120 may recognize that the user touches the touch area TA, based on the first row output signal OUT_X1.

That is, in the first driving scheme, for example, the mutual-cap driving scheme, the touch driver 120 may sense that a touch of the user is made in the area (i.e., the touch area TA) where the first column touch line Y1 and the first row touch line X1 cross each other, by transmitting the first touch signal TS1 through the first column touch line Y1 and sensing a signal corresponding to the variation in the mutual capacitance Cm through the first row touch line X1.

Next, referring to FIGS. 1 and 7B, in the second driving scheme, that is, the self-cap driving scheme, the first row driver DRV_X1 may provide the first touch signal TS1 to the first row touch line X1, and the first column driver DRV_Y1 may provide the first touch signal TS1 to the first column touch line Y1. A phase and a frequency of the first touch signals TS1 provided from the first row driver DRV_X1 may be identical to those of the first touch signal TS1 provided from the first column driver DRV_Y1.

A finger of the user may make contact with the touch area TA where the first row touch line X1 and the first column touch line Y1 cross each other. In this case, as the same touch signals TS1 are respectively provided to the first row touch line X1 and the first column touch line Y1, there may be no signal change due to the mutual capacitance Cm formed by the first row touch line X1 and the first column touch line Y1. In contrast, the first row self-capacitance Csx1 formed by the user touch may cause a signal change or a potential change of the first row touch line X1 or a change in a charge amount of the first row touch line X1.

The first row amplifier A_X1 may detect a signal change or a potential change of the first row touch line X1 or a change in a charge amount of the first row touch line X1 by comparing a level of the first row touch line X1 with the reference signal VCM, and the detected change may be output as the first row output signal OUT_X1. Although not illustrated clearly in drawings, a signal change of the first column touch line Y1 may also be detected in a similar scheme. As described above, the touch driver 120 may sense that a touch of the user is made in the area (i.e., the touch area TA) where the first column touch line Y1 and the first row touch line X1 cross each other, by sensing a signal change of each of the first column touch line Y1 and the first row touch line X1.

In an example embodiment, as illustrated in FIG. 7B, the first row driver DRV_X1 and the first column driver DRV_Y1 may be connected with a device ground GND_d, and the user may be connected with a body ground GND_b. As described above, in the case where the user contacts a housing or any other portion of the electronic device 100 while putting his/her finger on the touch panel 110, the body ground GND_b and the device ground GND_d may be identical. In contrast, in the case where the user puts only his/her finger on the touch panel 110 and does not contact any other portion of the electronic device 100, the body ground GND_b and the device ground GND_d may be different. In the case where the body ground GND_b and the device ground GND_d are different (i.e., in the case of the low ground state), the sensitivity of the first row output signal OUT_X1 or the first column output signal OUT_Y1 may be reduced.

In detail, a body potential $V_B$ of the user may be expressed by Equation 1 below.

$$V_B = \frac{C_{sy1} \times V_{Y1} + C_{sx1} \times V_{X1}}{Z + C_{sy1} + C_{sx1}} = \frac{1}{1 + Z/(C_{sy1} + C_{sx1})} \times TS \quad \text{[Equation 1]}$$

In Equation 1, $V_B$ may indicate a body potential of the user, $C_{sy1}$ may indicate a first column self-capacitance formed by the user's finger and the first column touch line Y1, $V_{Y1}$ may indicate a potential of the first column touch line, $C_{sx1}$ may indicate a value of a first self-capacitance formed by the user's finger and the first row touch line X1, $V_{X1}$ may indicate a potential of the first row touch line X1, "Z" may indicate an impedance of the user's body, and TS may indicate a first touch signal provided to the first row touch line X1 or the first column touch line Y1.

In the case where a ground state of the user is the good ground state, that is, in the case where the body ground GND_b of the user is identical to the device ground GND_d, because a value the impedance "Z" of the user's body is relatively great compared to the first column self-capacitance Csy1 and the first row self-capacitance Csx1 (e.g., approximately 200 pF), a body potential $V_B$ of the user is not greatly influenced by a potential $V_{X1}$ of the first row touch line X1, a potential $V_{Y1}$ of the first column touch line Y1, or the touch signal TS.

In contrast, in the case where the ground state of the user is the low ground state, that is, in the case where the body ground GND_b of the user is different from the device ground GND_d, because the value the impedance "Z" of the user's body is relatively small compared to the first column self-capacitance Csy1 and the first row self-capacitance Csx1 or is similar (e.g., a few pF) in magnitude to the first column self-capacitance Csy1 and the first row self-capacitance Csx1, the body potential $V_B$ of the user is influenced by a potential $V_{X1}$ of the first row touch line X1, a potential $V_{Y1}$ of the first column touch line Y1, or the touch signal TS. In this case, the body potential $V_B$ of the user may fluctuate by the touch signal TS, thereby causing a decrease in the sensitivity of the first row output signal OUT_X1 or the first column output signal OUT_Y1.

In an example embodiment, as touch signals of reverse phases are respectively provided to the first row touch line X1 and the first column touch line Y1, changes of a body potential due to the impedance of the user's body may cancel out.

For example, as illustrated in FIG. 7C, the first column driver DRV_Y1 may provide the first touch signal TS1 to the first column touch line Y1, and the first row driver DRV_X1 may provide a second touch signal TS2 to the first row touch line X1. In this case, the first touch signal TS1 and the second touch signal TS2 may be reverse phase signals having the same frequency. In other words, in the case where the first touch signal TS1 has a level of logical high, the second touch signal TS2 may have a level of logical low; in contrast, in the case where the first touch signal TS1 has a level of logical low, the second touch signal TS2 may have a level of logical high.

In this case, as understood from Equation 1 above, under the assumption that Csy1 and Csx1 are identical, the body potential $V_B$ of the user may be maintained at "0" regardless of a potential of the first column touch line Y1 and the first row touch line X1. In an example embodiment, when a user touch is made, in general, values of Csy1 and Csx1 may be substantially identical or similar. As described with reference to FIG. 5, because the user touch is made over a plurality of row touch lines and a plurality of column touch lines, Csx1 formed between the user's finger and the plurality of row touch lines and Csy1 formed between the user's finger and the plurality of column touch lines may be substantially identical.

That is, as illustrated in FIG. 7C, as the touch signals provided to the first row touch line X1 and the first column touch line Y1 are driven in reverse phases, an output signal that is uniform regardless of a ground state of the user may be sensed.

In an example embodiment, in the case of the second driving scheme described with reference to FIG. 7B, the sensitivity of the sensed signal may vary depending on a ground state of the user. In contrast, in the case of the third driving scheme described with reference to FIG. 7C, the sensitivity of the sensed signal may be maintained uniformly regardless of a ground state of the user. That is, a ground state of the user may be determined by comparing a signal sensed through the second driving scheme and a signal sensed through the third driving scheme.

The touch driving schemes described with reference to FIGS. 7A to 7C are examples for describing the inventive concepts easily, and the inventive concepts is not limited thereto. For example, the touch driver 120 according to the inventive concepts may individually or collectively control a plurality of column touch lines and a plurality of row touch lines, based on the touch driving schemes described with reference to FIGS. 7A to 7C.

In an example embodiment, the touch profile information TPF included in the secondary biometrics SB may be obtained through the first driving scheme (e.g., a mutual-cap driving scheme) described with reference to FIG. 7A, the first indicator information IND1 included in the secondary biometrics SB may be obtained through the first driving scheme (e.g., a first self-cap driving scheme) described with reference to FIG. 7B, and the second indicator information IND2 included in the secondary biometrics SB may be obtained through the third driving scheme (e.g., a second self-cap driving scheme) described with reference to FIG. 7C.

Figure 8:
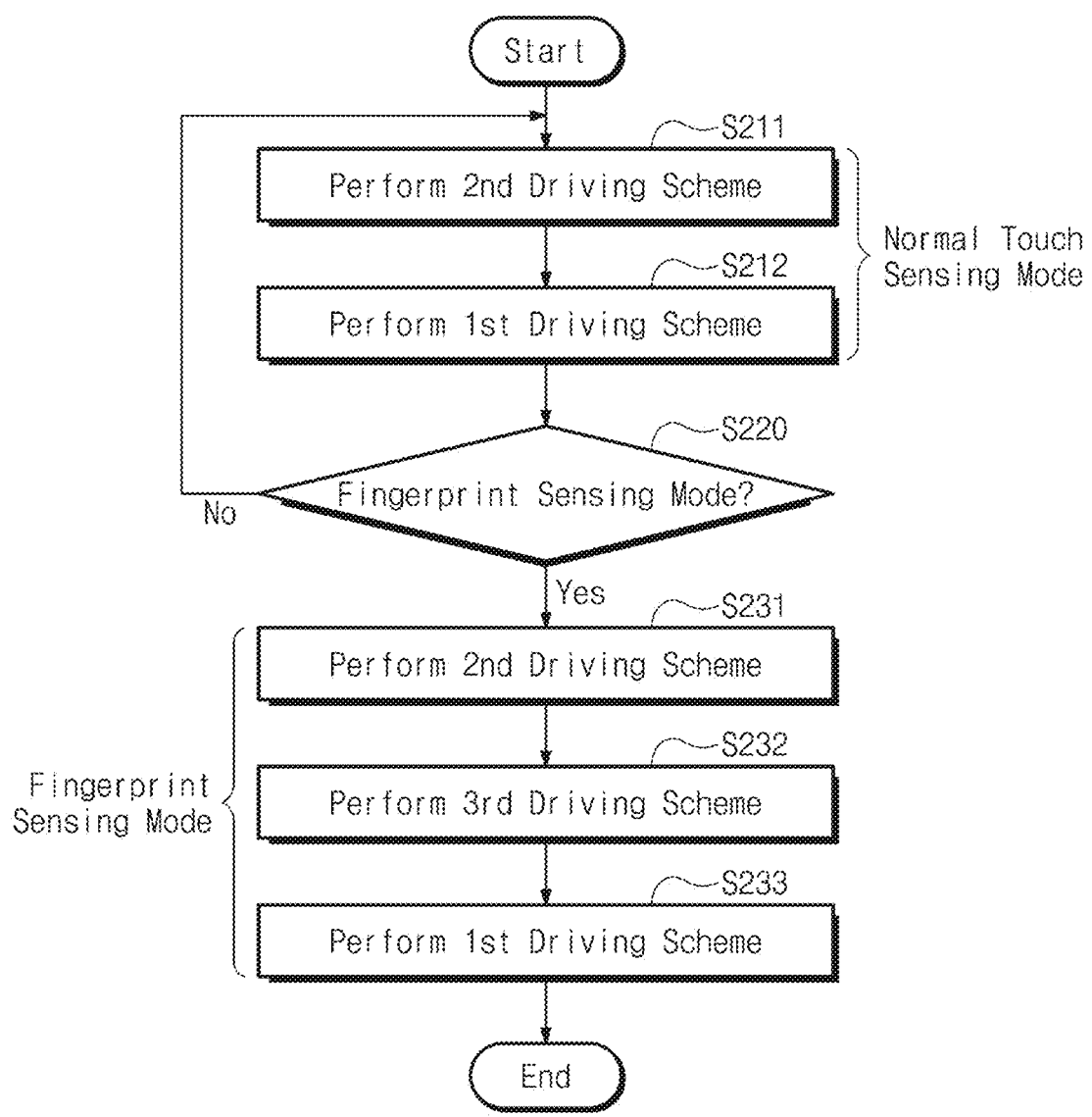
FIG. 8 is a flowchart illustrating an operation of a touch driver of FIG. 1.

FIG. 8 is a flowchart illustrating an operation of a touch driver of FIG. 1. Referring to FIGS. 1 and 8, when the electronic device 100 is in a normal mode or the touch driver 120 is in a normal touch sensing mode, the touch driver 120 may perform operation S211 to operation S212. Alternatively, when the electronic device 100 or the touch driver 120 is in a fingerprint sensing mode, the touch driver 120 may perform operation S231 to operation S233.

In operation S211, the touch driver 120 may control the touch panel 110 based on the second driving scheme (e.g., the self-cap driving scheme). For example, the touch driver 120 may generate first touch data by providing a first touch signal to a plurality of column touch lines and a plurality of row touch lines and sensing a potential change or a signal change of each of the plurality of column touch lines and the plurality of row touch lines, as described with reference to FIG. 7B. The touch driver 120 or the application processor 170 may sense a touch of the user, based on the first touch data.

In operation S212, the touch driver 120 may control the touch panel 110 based on the first driving scheme (e.g., the mutual-cap driving scheme). For example, the touch driver 120 may generate second touch data by providing the first touch signal to the plurality of column touch lines and a voltage of a uniform level to the plurality of row touch lines and sensing a voltage change or a signal change of each of the plurality of row touch lines, as described with reference to FIG. 7A. The touch driver 120 or the application processor 170 may sense a touch of the user, based on the second touch data.

In an example embodiment, the second driving scheme (e.g., the self-cap driving scheme) may be robust against a touch noise occurring due to a foreign substance or any other factor put on the touch panel 110, and the first driving scheme (e.g., the mutual-cap driving scheme) may support a multi-touch. That is, the touch driver 120 may be configured to use the first driving scheme and the second driving scheme together in the normal touch sensing mode such that normal touch sensing and multi-sensing are supported.

In operation S220, the touch driver 120 may determine whether a current mode is a fingerprint sensing mode. When it is determined that the current mode is not the fingerprint sensing mode, the touch driver 120 may continue to perform operation S211 and operation S212 and may sense a touch of the user.

When it is determined that the current mode is the fingerprint sensing mode, the touch driver 120 may perform operation S231 to operation S233. In operation S231, the touch driver 120 may control the touch panel 110 based on the second driving scheme (e.g., the first self-cap driving scheme). Operation S231 is similar to operation S211, and thus, additional description will be omitted to avoid redundancy.

In operation S232, the touch driver 120 may control the touch panel 110 based on the third driving scheme (e.g., the second self-cap driving scheme). For example, as described with reference to FIG. 7C, the touch driver 120 may provide the first touch signal to the plurality of column touch lines and the second touch signal to the plurality of row touch lines. In this case, the first touch signal and the second touch signal may be reverse phase signals. The touch driver 120 may sense a signal change through the plurality of column touch lines or the plurality of row touch lines.

In operation S233, the touch driver 120 may control the touch panel 110 based on the first driving scheme (e.g., the mutual-cap driving scheme). Operation S233 is similar to operation S212, and thus, additional description will be omitted to avoid redundancy.

In an example embodiment, during the fingerprint sensing mode, the touch driver 120 may obtain the first indicator information IND1 in operation S231 (i.e., through an operation of the first self-cap driving scheme), may obtain the second indicator information IND2 in operation S232 (i.e., through an operation of the second self-cap driving scheme), and may obtain the touch profile information TPF in operation S233 (i.e., through an operation of the mutual-cap driving scheme). The obtained information IND1, IND2, and TPF may be provided to the authentication module 160 as the secondary biometrics SB.

Figure 9:
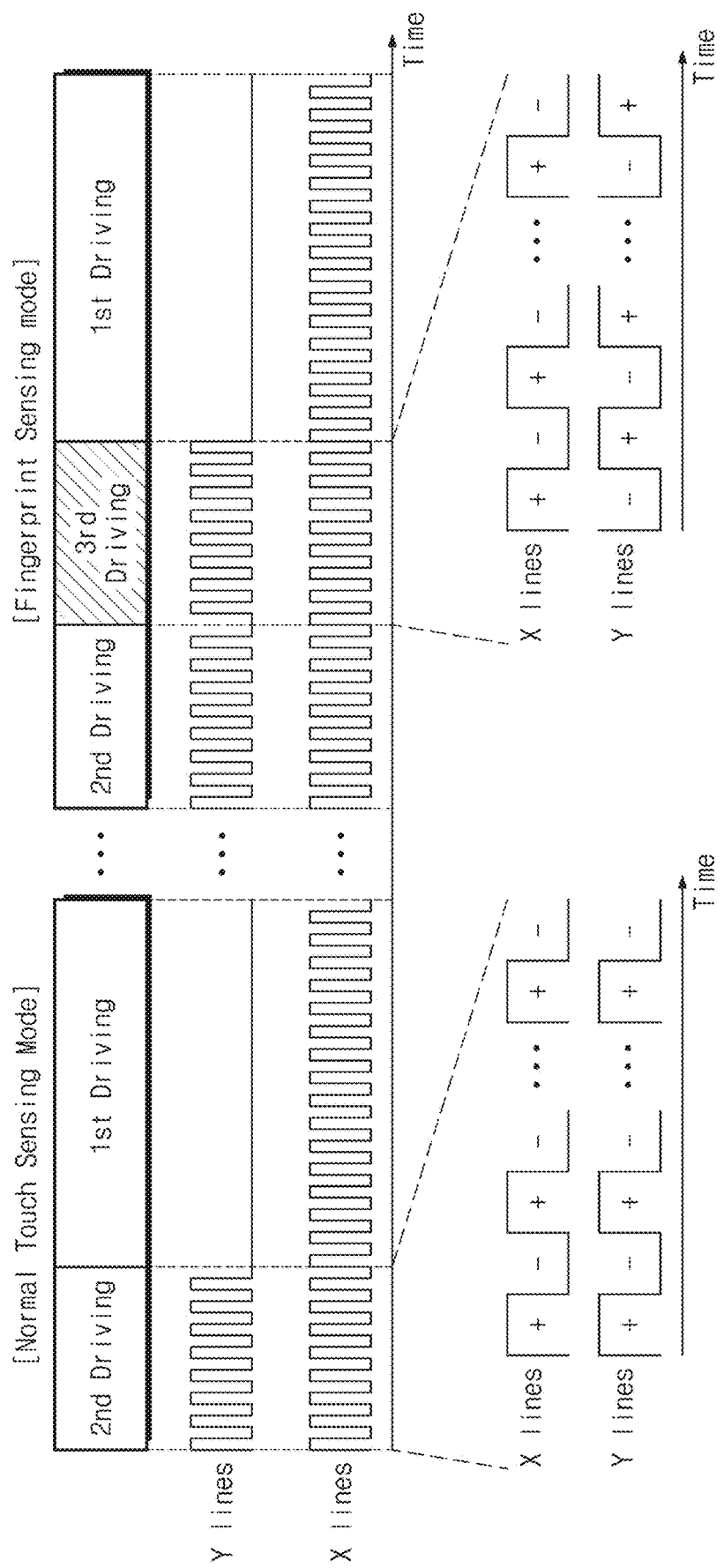
FIG. 9 is a timing diagram illustrating an operation of a touch driver of FIG. 1.

FIG. 9 is a timing diagram illustrating an operation of a touch driver of FIG. 1. For brevity of drawing and convenience of description, signals that are provided to row touch lines and column touch lines of the touch panel 110 are illustrated in the timing diagram of FIG. 9. In this case, it is assumed that a signal change due to a touch of the user is excluded from the signals. However, the inventive concepts is not limited thereto. For example, signal levels of touch lines may actually vary depending on a touch of the user or any other factors.

Referring to FIGS. 1 and 9, during the normal touch sensing mode, the touch driver 120 may control row touch lines X lines and column touch lines Y lines based on the second driving scheme and the first driving scheme.

For example, during the second driving scheme, the touch driver 120 may sense a touch of the user by providing a touch signal to the row touch lines X lines and column touch lines Y lines and sensing a signal change(s) of the row touch lines X lines or the column touch lines Y lines. In this case, as illustrated in FIG. 9, the touch signal provided to the row touch lines X lines and the touch signal provided to the column touch lines Y lines may have the same phase and the same frequency.

During the first driving scheme, the touch driver 120 may sense a touch of the user by providing the touch signal to the column touch lines Y lines and a voltage of a uniform level to the row touch lines X lines and sensing a signal change(s) of the row touch lines X lines. Although not illustrated in drawings, during the first driving scheme, the touch driver 120 may sense a touch of the user by providing the touch signal to the row touch lines X lines and the voltage of the uniform level to the column touch lines Y lines and sensing a signal change(s) of the column touch lines Y lines.

Afterwards, during the fingerprint sensing mode, the touch driver 120 may control the row touch lines X lines and the column touch lines Y lines based on the second driving scheme, the third driving scheme, and the first driving scheme.

For example, the second driving scheme and the first driving scheme are similar to those described above, and thus, additional description will be omitted to avoid redundancy. During the third driving scheme, the touch driver 120 may provide a first touch signal to the row touch lines X lines and a second touch signal to the column touch lines Y lines and may sense a signal change(s) of the row touch lines X lines or the column touch lines Y lines. In this case, the first touch signal provided to the row touch lines X lines and the second touch signal provided to the column touch lines Y lines may be reverse in phase. That is, as illustrated in FIG. 9, when the first touch signal provided to the row touch lines X lines is of a (+) level, the second touch signal provided to the column touch lines Y lines may be of a (−) level; in contrast, when the first touch signal provided to the row touch lines X lines is of a (−) level, the second touch signal provided to the column touch lines Y lines may be of a (+) level.

During the fingerprint sensing mode, the touch driver 120 may obtain the first indicator information IND1 based on the second driving scheme, may obtain the second indicator information IND2 based on the third driving scheme, and may obtain the touch profile information TPF based on the first driving scheme.

In an example embodiment, in the above embodiments, an operating mode of the touch driver 120 may be classified as the normal touch sensing mode or the fingerprint sensing mode, but the inventive concepts is not limited thereto. For example, regardless of an operating mode, the touch driver 120 may operate based on the first driving scheme, the second driving scheme, and the third driving scheme.

Figure 10A:
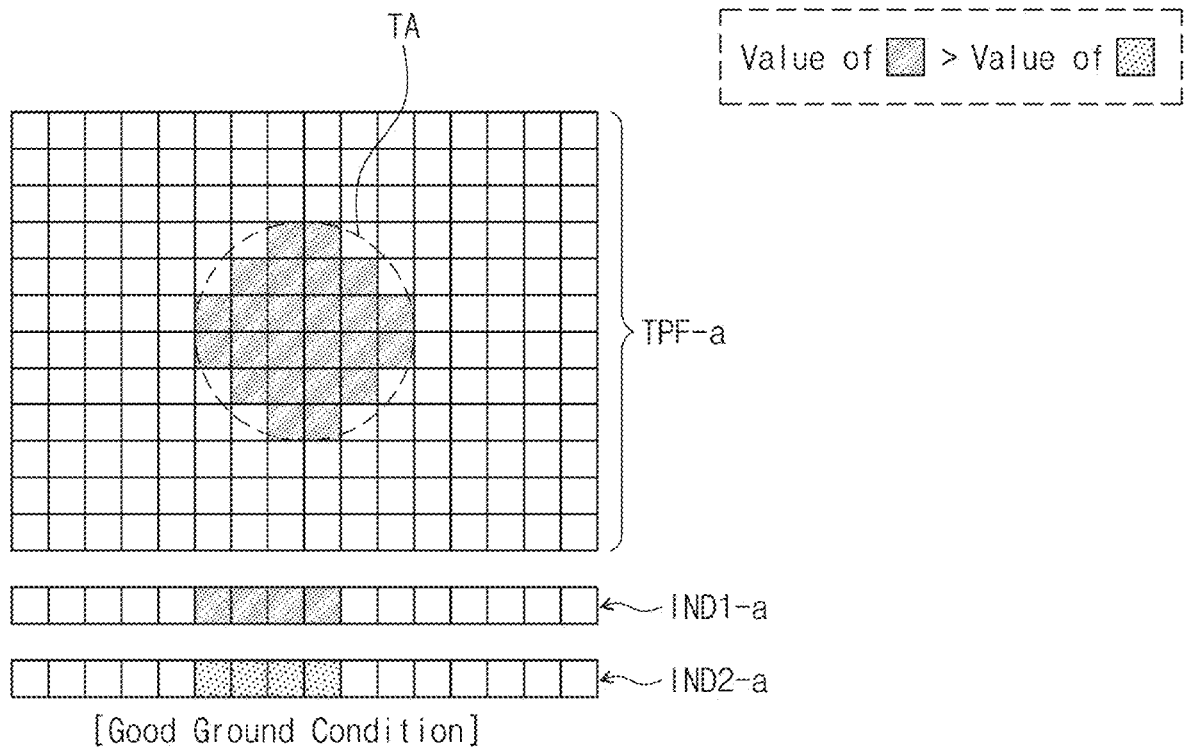
FIGS. 10A to 10C are diagrams illustrating secondary biometrics obtained by an operation of a touch driver.
Figure 10B:
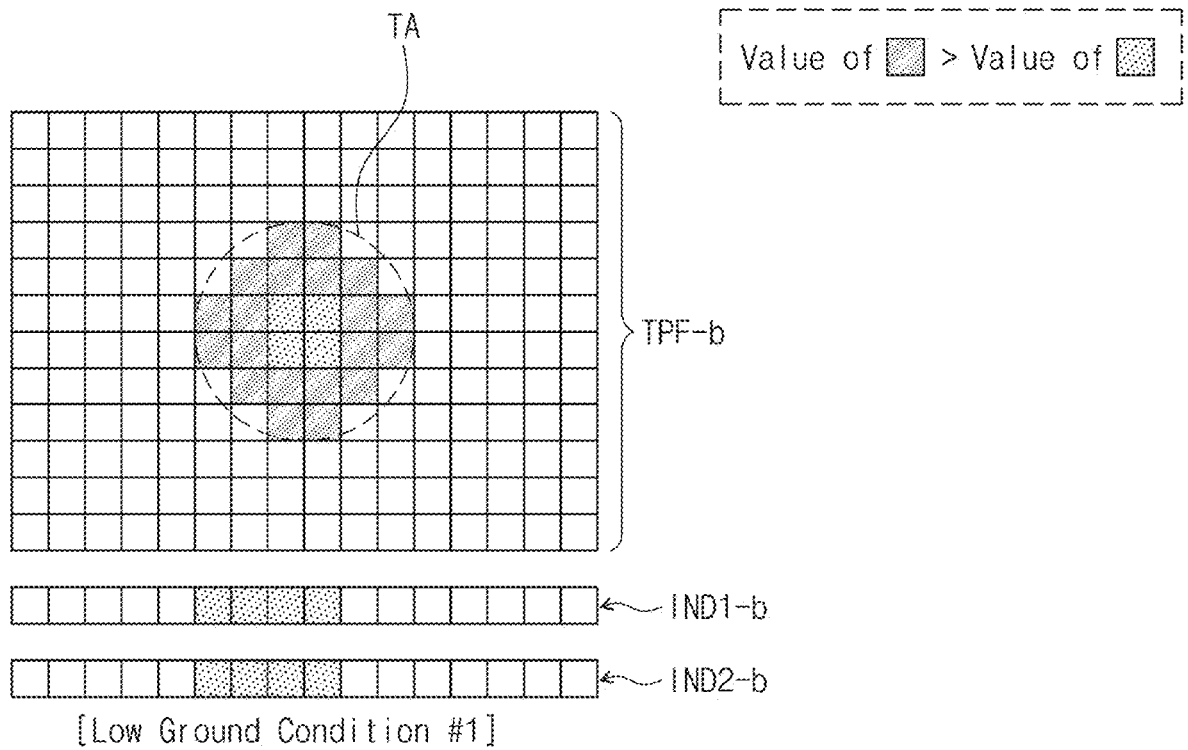
Figure 10C:
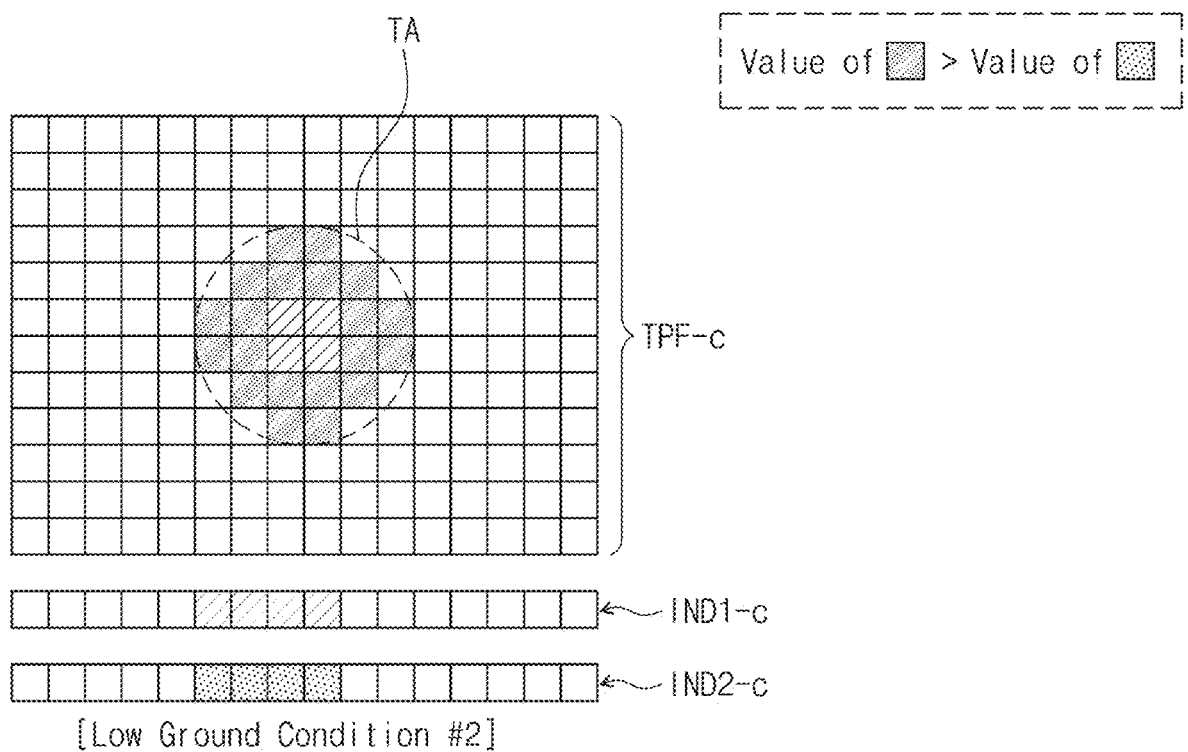
Figure 11A:
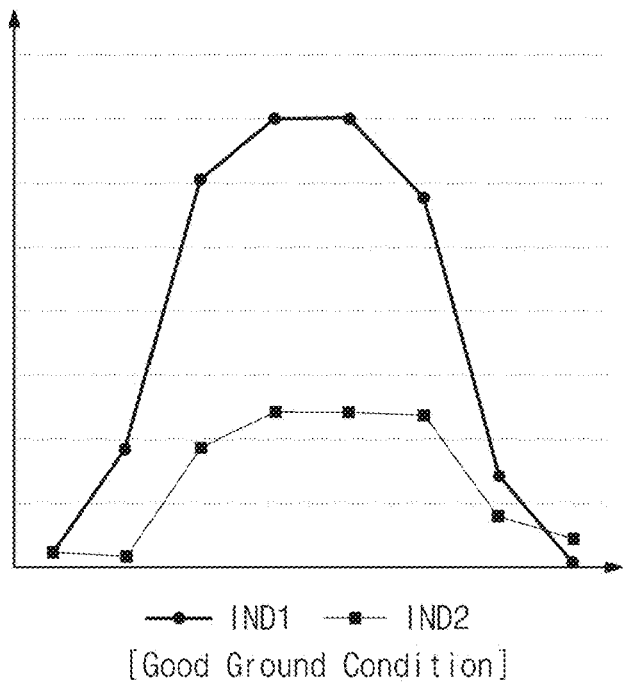
FIGS. 11A to 11C are graphs for describing first indicator information and second indicator information according to a ground state of a user.
Figure 11B:
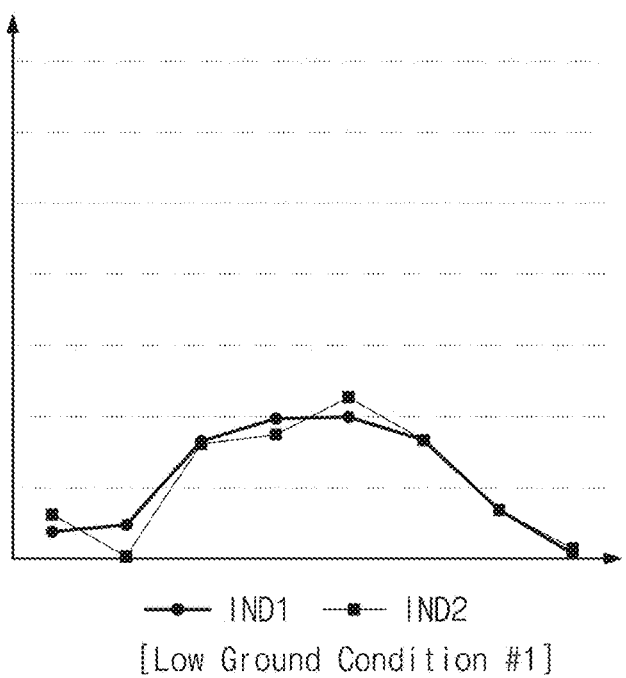
Figure 11C:
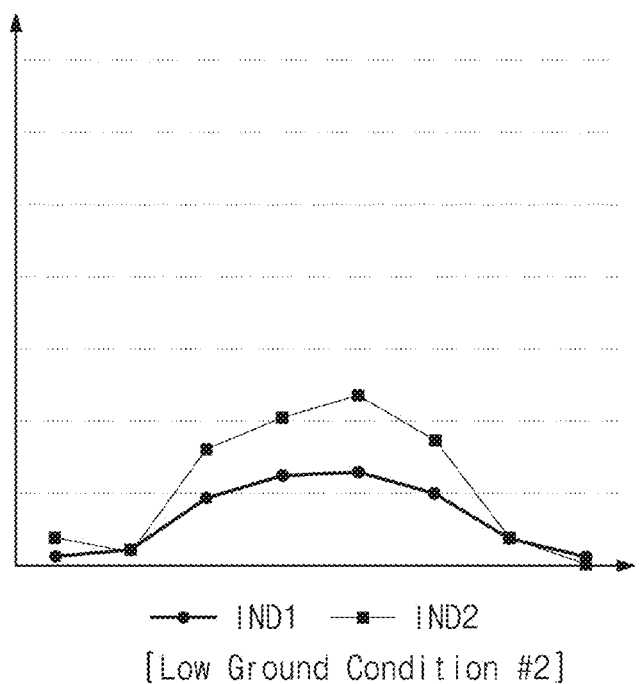

FIGS. 10A to 10C are diagrams illustrating secondary biometrics obtained by an operation of a touch driver. FIGS. 11A to 11C are graphs for describing first indicator information and second indicator information according to a ground state of a user.

For brevity of drawing and convenience of description, values of the touch profile information TPF, the first indicator information IND1, and the second indicator information IND2 of FIGS. 10A to 10C are illustrated as rough, but the inventive concepts is not limited thereto. For example, actually measured or collected values may have various forms.

In an example embodiment, FIGS. 10A to 10C relate to examples where ground states of the user are different, and FIGS. 11A to 11C relate to examples where ground states of the user are different. For example, FIGS. 10A and 11A are associated with the case where a ground state of the user is the good ground state, FIGS. 10B and 11B are associated with the case where a ground state of the user is a first low ground state, and FIGS. 10C and 11C are associated with the case where a ground state of the user is a second low ground state.

For example, that a ground state of the user is the good ground state may mean a state where at least a portion of the user's body touches a housing or any other portion of the electronic device 100. That a ground state of the user is the first low ground state may mean a state where only the user's finger touches a touch panel with the electronic device 100 put on a desk. That a ground state of the user is the second low ground state may mean a state where only the user's finger touches a touch panel with the electronic device 100 put on a paper box (in this case, a location of the electronic device 100 is different from that in the first low ground state). In an example embodiment, touch profile information TPF-a, TPF-b, and TPF-c illustrated in FIGS. 10A to 10C may be information obtained through the first driving scheme (i.e., the mutual-cap driving scheme), first indicator information IND1-a, IND1-b, and IND1-c may be information obtained from a plurality of column touch lines through the second driving scheme (i.e., the first self-cap driving scheme), and second indicator information IND2-a, IND2-b, and IND2-c may be information obtained from the plurality of column touch lines through the third driving scheme (i.e., the second self-cap driving scheme).

First of all, as illustrated in FIG. 10A, in the case where a ground state of the user is the good ground state, values of the touch profile information TPF-a, which correspond to the touch area TA, may be a first value (marked by a shade of gray). Values of the first indicator information IND1-a, which correspond to the column touch lines of the touch area TA, may be the first value, and values of the second indicator information IND2-b, which correspond to the column touch lines of the touch area TA, may be a second value (marked by a shade of dot). In this case, the first value may be greater than the second value.

Next, as illustrated in FIG. 10B, in the case where a ground state of the user is the first low ground state, values of the touch profile information TPF-b, which correspond to the touch area TA, may be the first value (marked by a shade of gray) or the second value (marked by a shade of dot). Values of the first indicator information IND1-b, which correspond to the column touch lines of the touch area TA, may be the second value (marked by a shade of dot), and values of the second indicator information IND2-b, which correspond to the column touch lines of the touch area TA, may be the second value (marked by a shade of dot). In this case, the first value may be greater than the second value.

Then, as illustrated in FIG. 10C, in the case where a ground state of the user is the second low ground state, values of the touch profile information TPF-c, which correspond to the touch area TA, may be the first value (marked by a shade of gray) or a third value (marked by a shade of slash). Values of the first indicator information IND1-c, which correspond to the column touch lines of the touch area TA, may be the third value (marked by a shade of slash), and values of the second indicator information IND2-c, which correspond to the column touch lines of the touch area TA, may be the second value (marked by a shade of dot). In this case, the first value may be greater than the second value, and the second value may be greater than the third value.

As illustrated in FIGS. 10A to 10C, the touch profile information TPF-a, TPF-b, and TPF-c, the first indicator information IND1-a, IND1-b, and IND1-c, and the second indicator information IND2-a, IND2-b, and IND2-c may have different forms or different patterns depending on ground states of the user.

In detail, in the case where a ground state of the user is the good ground state, as illustrated in FIG. 11A, the first indicator information IND1-a and the second indicator information IND2-a may have different values. In particular, as illustrated in FIG. 11A, values of the first indicator information IND1-a may be greater than values of the second indicator information IND2-a.

In contrast, in the case where a ground state of the user is the first low ground state, as illustrated in FIG. 11B, a value difference of the first indicator information IND1-a and the second indicator information IND2-a may not almost exist. Alternatively, in the case where a ground state of the user is the second low ground state, as illustrated in FIG. 11C, values of the first indicator information IND1-c may be smaller than values of the second indicator information IND2-c.

As a result, a ground state of the user at the time when a touch is made by the user's finger may be classified depending on touch profile information, first indicator information, and second indicator information obtained through the first to third driving schemes. As a ground state of the user is used in the fingerprint matching operation or the anti-spoofing operation performed at the authentication module 160, the reliability of the authentication module 160 may be improved.

For example, as described above, a signal that is detected through the touch panel 110 may change depending on a ground state of the user. That is, even though a real finger of the user is in contact with the touch panel 110, in the case where a ground state of the user is the low ground state, the sensitivity of the signal detected through the touch panel 110 may be reduced. In this case, the authentication module 160 may determine the real finger of the user as a false material. In contrast, according to an example embodiment of the inventive concepts, because a ground state of the user is determined based on the touch profile information TPF, the first indicator information IND1, and the second indicator information IND2, the probability of incorrect determination of the authentication module 160 may be reduced by using an anti-spoofing algorithm appropriate for a ground state of the user or adjusting parameters used in the anti-spoofing algorithm.

FIG. 12 is a diagram illustrating an operation of an electronic device of FIG. 1. Referring to FIGS. 1 and 12, in operation S310, the touch driver 120 may perform touch sensing. For example, as described with reference to FIGS. 8 and 9, the touch driver 120 may generate touch data by controlling the touch panel 110 based on the second driving scheme (e.g., the first self-cap driving scheme) and the first driving scheme (e.g., the mutual-cap driving scheme).

In operation S311, the touch driver 120 may transfer the touch data to the application processor 170. In an example embodiment, the application processor 170 may recognize a touch of the user based on the touch data and may perform an operation corresponding to the recognized touch.

In operation S320, the application processor 170 may determine whether fingerprint authentication is performed. For example, the application processor 170 may receive a request for fingerprint authentication from the user or from any other applications.

When the fingerprint authentication is not performed or is not required, the application processor 170 and the touch driver 120 may continue operation S310 and operation S320.

When the fingerprint authentication is performed or is required, the application processor 170 may change an operating mode of the touch driver 120. For example, the application processor 170 may change the operating mode of the touch driver 120 to the fingerprint sensing mode. In operation S322, the application processor 170 may enable the fingerprint sensor 150.

In operation S330, the fingerprint sensor 150 may be enabled under control of the application processor 170 and may obtain information about a fingerprint of the user, that is, the fingerprint information FP. In operation S331, the fingerprint sensor 150 may transmit the fingerprint information FP to the authentication module 160.

In operation S340, the touch driver 120 may sense the secondary biometrics SB. For example, the operating mode of the touch driver 120 may be changed to the fingerprint sensing mode in operation S321. In this case, as described with reference to FIGS. 7A to 11C, the touch driver 120 may obtain the touch profile information TPF by controlling the touch panel 110 based on the first driving scheme, may obtain the first indicator information IND1 by controlling the touch panel 110 based on the second driving scheme, and may obtain the second indicator information IND2 by controlling the touch panel 110 based on the third driving scheme. In an example embodiment, the order of the first to third driving schemes may be variously changed or modified. The touch profile information TPF, the first indicator information IND1, and the second indicator information IND2 may be included in the secondary biometrics SB. In operation S341, the touch driver 120 may transmit the secondary biometrics SB to the authentication module 160.

In operation S350, the authentication module 160 may perform the fingerprint matching operation and the anti-spoofing operation based on the fingerprint information FP from the fingerprint sensor 150 and the secondary biometrics SB (e.g., the touch profile information TPF, the first indicator information IND1, and the second indicator information IND2) from the touch driver 120. In an example embodiment, the authentication module 160 may perform the fingerprint matching operation based on the fingerprint information FP and may perform the anti-spoofing operation based on the secondary biometrics SB. In this case, the authentication module 160 may determine a ground state of the user based on the first indicator information IND1 and the second indicator information IND2 and may perform the anti-spoofing operation by using an algorithm or a parameter that varies depending on the determined ground state. The authentication module 160 may output a final authentication result based on a result of the fingerprint matching operation and a result of the anti-spoofing operation.

Alternatively, the authentication module 160 may perform multimodal machine learning based on the fingerprint information FP and the secondary biometrics SB and may output a final authentication result as a result of the multi-modal machine learning.

In operation S351, the authentication module 160 may transmit the final authentication result to the application processor 170. Although not illustrated in drawings, the application processor 170 may perform various operations (e.g., operations of determining whether to unlock an electronic device, determining whether to make financial payment, and determining whether to permit an access to secure data) is based on the final authentication result.

Figure 13:
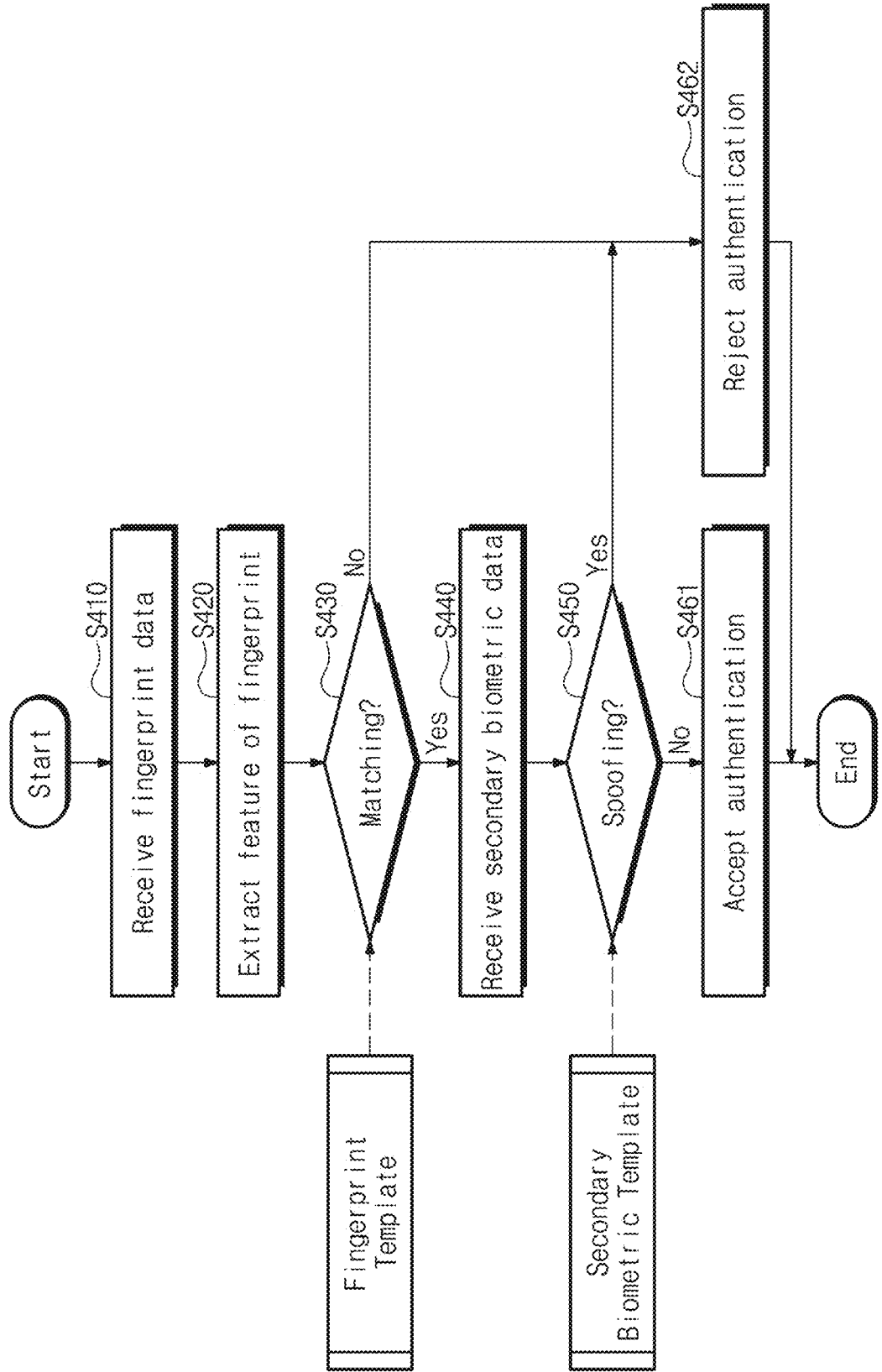
FIG. 13 is a flowchart illustrating an authentication operation of an authentication module of FIG. 1.

FIG. 13 is a flowchart illustrating an authentication operation of an authentication module of FIG. 1. In an example embodiment, operations according to the flowchart of FIG. 13 may be included in operation S350 of FIG. 12.

Referring to FIGS. 1 and 13, in operation S410, the authentication module 160 may receive the fingerprint information FP from the fingerprint sensor 150. In operation S420, the authentication module 160 may extract features from the fingerprint information FP.

In operation S430, the authentication module 160 may compare the extracted features with a preset fingerprint template. For example, the electronic device 100 may include a fingerprint template corresponding to fingerprint information collected from a user authenticated in advance. The authentication module 160 may determine whether the fingerprint information FP received in operation S410 is matched with the preset fingerprint template, based on the extracted features. In an example embodiment, fingerprint matching in operation S430 may be performed based on machine learning.

When the fingerprint information FP is not matched with the preset fingerprint template, in operation S462, the authentication module 160 may reject authentication or may not accept authentication.

When the fingerprint information FP is matched with the preset fingerprint template, in operation S440, the authentication module 160 may receive the secondary biometrics SB from the touch driver 120. As described above, the secondary biometrics SB may include the touch profile information TPF, the first indicator information IND1, and the second indicator information IND2.

In operation S450, the authentication module 160 may perform the anti-spoofing operation based on the secondary biometrics SB and a preset secondary biometrics template. In this case, the authentication module 160 may determine a ground state of the user based on the first indicator information IND1 and the second indicator information IND2. The authentication module 160 may determine whether obtained fingerprint information is faked, based on the determined ground state and the touch profile information TPF. Alternatively, the authentication module 160 may determine whether fingerprint information is faked, by performing the multimodal machine learning on the touch profile information TPF, the first indicator information IND1, and the second indicator information IND2.

When the obtained fingerprint information FP is faked (i.e., Yes in operation S450), in operation S462, the authentication module 160 may reject authentication or may not accept authentication. When the obtained fingerprint information FP is not faked (i.e., No in operation S450), in operation S461, the authentication module 160 may accept authentication. A final result of the authentication operation of the authentication module 160 (e.g., a result indicating whether the authentication operation is accepted or rejected) may be provided to the application processor 170.

FIG. 14 is a flowchart illustrating an anti-spoofing operation of an authentication module. FIGS. 15A to 15C are graphs for describing an anti-spoofing operation of an authentication module of FIG. 14. In an example embodiment, operations according to the flowchart of FIG. 14 may be included in operation S450 of FIG. 13. In an example embodiment, in the graphs of FIGS. 15A to 15C, each axis may represent features extracted from the touch profile information TPF.

Referring to FIGS. 1 and 14, in operation S510, the authentication module 160 may determine a ground state of the user at the time when the fingerprint information FP is obtained, based on the first indicator information IND1 and the second indicator information IND2. For example, a value (e.g., a maximum value, a mean value, or an intermediate value) of the first indicator information IND1 and a value (e.g., a maximum value, a mean value, or an intermediate value) of the second indicator information IND2 may be compared. The case where a comparison result indicates that the value of the first indicator information IND1 is greater than the value of the second indicator information IND2 may be determined as a ground state of the user is good; the case where a comparison result indicates that the value of the first indicator information IND1 is smaller than the value of the second indicator information IND2 or that a difference between the values is equal to or less than a reference value may be determined as a ground state of the user is bad.

When the ground state of the user is determined as good, that is, in the case of "Yes" of operation S520, in operation S531, the authentication module 160 may extract features from the touch profile information TPF by using a first algorithm and may decide liveness based on the extracted features. When the ground state of the user is determined as not good, that is, in the case of "No" of operation S520, in operation S532, the authentication module 160 may extract features from the touch profile information TPF by using a second algorithm and may decide liveness based on the extracted features.

For example, to perform the anti-spoofing operation, the authentication module 160 may extract various features from the touch profile information TPF. The extracted features may include a variety of information, which is associated with a region of interest (ROI) (e.g., the touch area TA) of a touch signal included in the touch profile information TPF, such as a peak-to-peak value, a mean value, and a variance value. In an example embodiment, to reflect a shape condition of the touch area TA belonging to the touch profile information TPF as a feature, information about whether a curved surface is close to a Gaussian shape or is close to a donut shape may be quantified through values such as a sum of squared error (SSE) between each point and a curved surface fit through processing such as surface fitting of the touch area TA. The extracted features or numerical values may be modeled to a feature space as illustrated in FIGS. 15A to 15C.

In this case, FIG. 15A shows the modeling of an example (i.e., Good GND) where a ground state of the user is good, FIG. 15B shows the modeling of an example (i.e., Low GND) where a ground state of the user is not good, and FIG. 15C shows the modeling of the case where an example (i.e., Good GND) where a ground state of the user is good and an example (i.e., Low GND) where a ground state of the user is not good are mixed.

In an example embodiment, the feature space of FIG. 15A may be implemented based on the first algorithm as described above, and the feature space of FIG. 15B may be implemented based on the second algorithm as described above. However, the inventive concepts is not limited thereto.

As illustrated in FIGS. 15A and 15B, in the case where a first feature space and a second feature space are implemented in the shape of being distinguished depending on a ground state (i.e., Good GND or Low GND) of the user, a boundary between features Live corresponding to a real finger of the user and features FAKE1 or FAKE2 corresponding to a false material may be clear on a feature space. This may mean that liveness is clearly identified or decided based on extracted features.

In contrast, as illustrated in FIG. 15C, in the case where a ground state of the user is not considered, a boundary between features Live corresponding to a real finger of the user and features FAKE1 or FAKE2 corresponding to a false material may not be clear on a feature space. This may mean that liveness is not clearly identified or decided based on extracted features.

That is, by modeling a feature space individually through an algorithm differently determined according to a ground state of the user, features corresponding to a real finger of the user and features corresponding to a false material may be clearly distinguished, and thus, the reliability of the anti-spoofing operation of the authentication module 160 may be improved.

An example embodiment is described with reference to FIGS. 14 to 15C as the number of ground states of the user is 2 (Good GND and Low GND), but the inventive concepts is not limited thereto. For example, the authentication module 160 may form a high-dimensional feature space by extracting features corresponding to a difference between the first indicator information IND1 and the second indicator information IND2, a ratio of the first indicator information IND1 and the second indicator information IND2, or a value of each of the first indicator information IND1 and the second indicator information IND2 and adding an axis of a feature space corresponding to the extracted features. In this case, various ground states of the user may be applied to the anti-spoofing operation.

In an example embodiment, the authentication module 160 may include a feature space former configured to form a feature space based on an algorithm varying depending on a ground state of the user. The authentication module 160 may classify features from each feature space by using a classifier such as a support vector machine (SVM) or a quadratic discriminant analysis (QDA) (i.e., may classify a thing put on a touch panel as a real finger of the user or a false material by using the SVM or the QDA).

Figure 16:
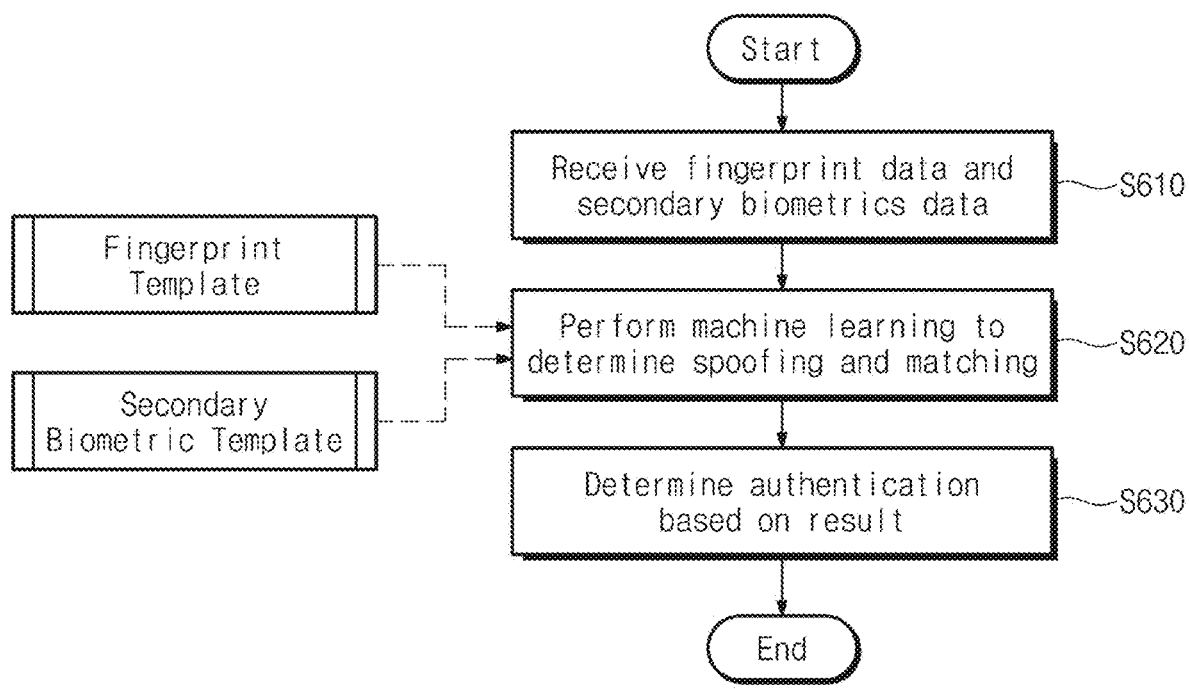
FIG. 16 is a flowchart illustrating an authentication operation of an authentication module.

FIG. 16 is a flowchart illustrating an authentication operation of an authentication module. In an example embodiment, operations according to the flowchart of FIG. 16 may be included in operation S350 of FIG. 12. In an example embodiment, the description is given as the operations according to the flowchart of FIG. 13 are classified into the fingerprint matching operation and the anti-spoofing operation, but the inventive concepts is not limited thereto. For example, as illustrated in FIG. 16, the fingerprint matching operation and the anti-spoofing operation may be performed at the same time or in parallel based on the multimodal machine learning.

Referring to FIGS. 1 and 16, in operation S610, the authentication module 160 may receive the fingerprint information FP from the fingerprint sensor 150 and may receive the secondary biometrics SB from the touch driver 120. As described above, the secondary biometrics SB may include the touch profile information TPF, the first indicator information IND1, and the second indicator information IND2.

In operation S620, the authentication module 160 may perform machine learning on the fingerprint information FP and the secondary biometrics SB and may perform fingerprint matching determination and likeness determination. For example, the authentication module 160 may perform the multimodal machine learning on the fingerprint information FP and the secondary biometrics SB and may perform fingerprint matching determination and likeness determination at the same time.

In operation S630, the authentication module 160 may perform authentication determination based on a result of the machine learning. For example, when the fingerprint information FP is matched with a preset fingerprint template and is determined as not faked, the authentication module 160 may accept authentication; if not, the authentication module 160 may reject authentication.

Figure 17:
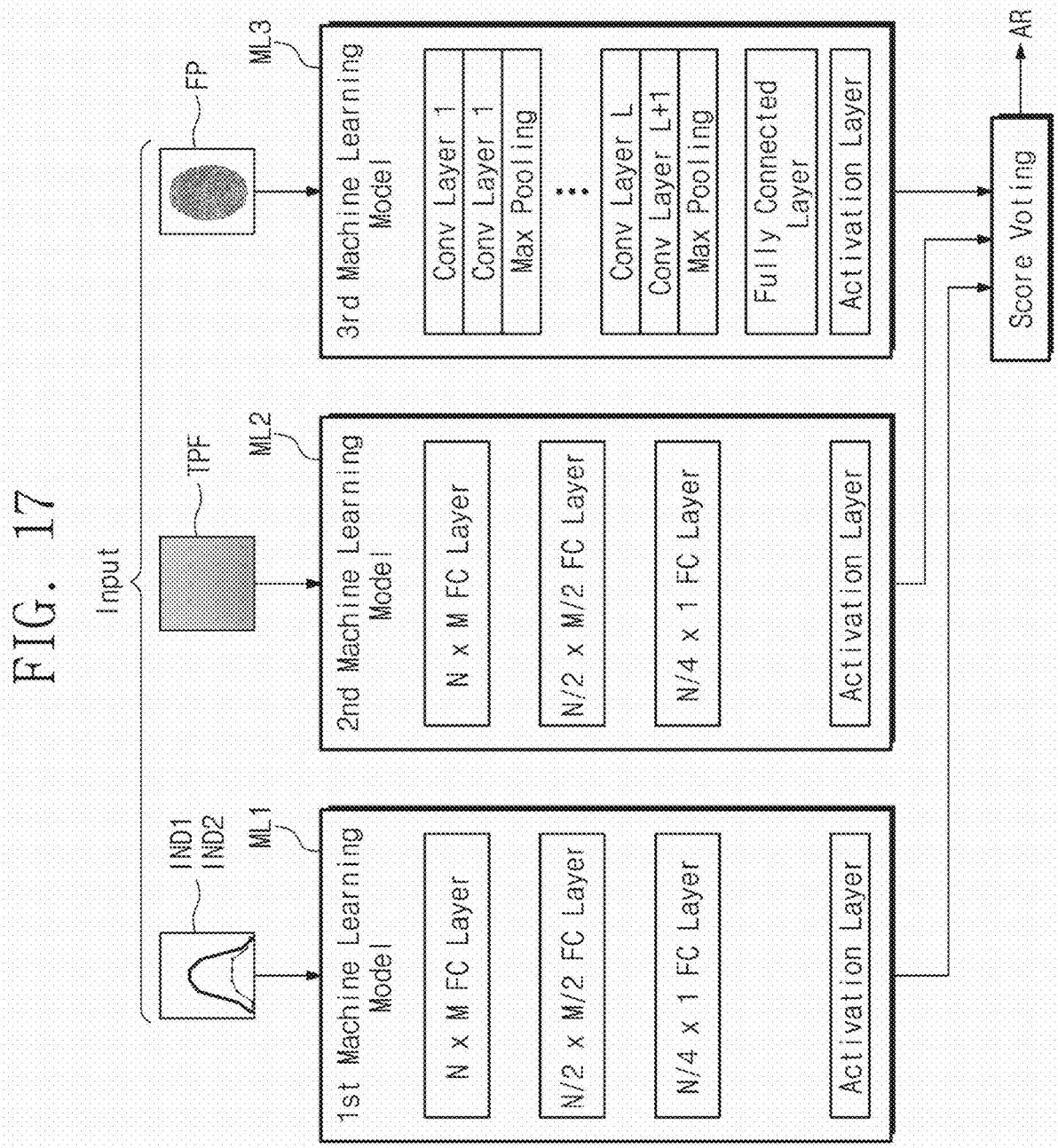
FIG. 17 is a diagram for describing an operation according to the flowchart of FIG. 16.

FIG. 17 is a diagram for describing an operation according to the flowchart of FIG. 16. For convenience of description, the description will be given as an example embodiment illustrated in FIG. 17 is performed by the authentication module 160 of FIG. 1. For brevity of drawing, reference numerals of function blocks of FIG. 17 are omitted.

Referring to FIGS. 1, 16, and 17, the authentication module 160 may include a first machine learning model ML1, a second machine learning model ML2, and a third machine learning model ML3. The authentication module 160 may be configured to perform the multimodal machine learning on input information Input based on the first to third machine learning models ML1 to ML3 and to output the authentication result AR as a result of the multimodal machine learning.

For example, the input information Input may include the first indicator information IND1, the second indicator information IND2, the touch profile information TPF, and the fingerprint information FP.

The first machine learning model ML1 may perform machine learning on the first indicator information IND1 and the second indicator information IND2, and the second machine learning model ML2 may perform machine learning on the touch profile information TPF. Each of the first and second machine learning models ML1 and ML2 may be a neural network including a plurality of fully connected layers N×M FC Layer, N/2×M/2 FC Layer, and N/4×1 FC Layer and an activation layer.

The third machine learning model ML3 may perform machine learning on the fingerprint information FP. The third machine learning model ML3 may be a convolutional neural network (CNN) including a plurality of convolution layers Cony Layer 1 to Cony Layer L+1, a max pooling layer, a fully connected layer, and an activation layer.

Results learned through the first to third machine learning models ML1 to ML3 may be provided to a score voting layer Score Voting, and the score voting layer Score Voting may output a final authentication result AR based on the learned results.

As described above, the authentication module 160 according to an example embodiment of the inventive concepts may perform the multimodal machine learning on various input information (e.g., the fingerprint information FP, the touch profile information TPF, the first indicator information IND1, and the second indicator information IND2) and may output the authentication result AR.

Figure 18:
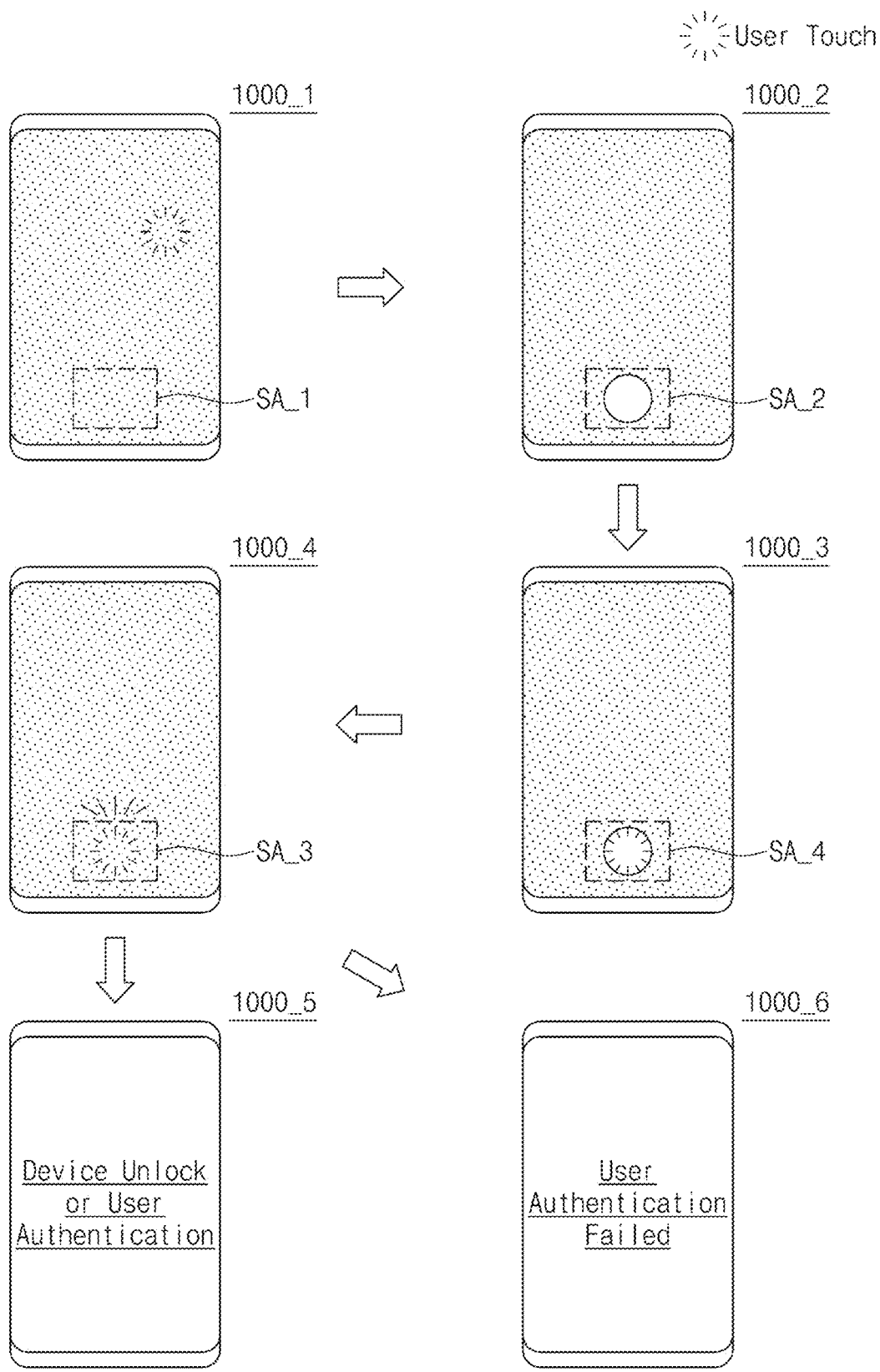
FIG. 18 is a conceptual diagram for describing an authentication process according to an example embodiment of the inventive concepts.

FIG. 18 is a conceptual diagram for describing an authentication process according to an example embodiment of the inventive concepts. For a brief description, components and descriptions that are unnecessary to describe an authentication process according to an example embodiment of the inventive concepts are omitted. In an example embodiment, an electronic device of FIG. 18 may be the electronic device 100 of FIG. 1 or may include the components 110 to 170 illustrated in FIG. 1.

Referring to FIG. 18, a display area of an electronic device 1000_1 may be in a turn-off state. In this state, a user touch may be sensed. For example, a touch driver (not illustrated) of the electronic device 1000_1 may sense the user touch by controlling a touch panel based on the second driving scheme (e.g., the first self-cap driving scheme) and the first driving scheme (e.g., the mutual-cap driving scheme). For example, the user touch may be sensed in the remaining portion of the display area other than a sensing area SA_1. Alternatively, although not illustrated in drawings, in an authentication operation, in the electronic device 1000_1, an area for sensing a touch of the user may be limited to the sensing area SA_1.

Afterwards, an electronic device 1000_2 may allow a light to be emitted from a sensing area SA_2 or a portion of the sensing area SA_2. This may be an indication for guiding a touch of the user.

Afterwards, an electronic device 1000_3 may sense the user touch on a sensing area SA_3.

Afterwards, an electronic device 1000_4 may allow a light to be emitted from a sensing area SA_4, for the purpose of obtaining the fingerprint information FP from the user touch. In this case, the area from which a light is emitted may be the whole sensing area SA_4 or may be an area (i.e., a user touch area) of the sensing area SA_4, in which the user touch is sensed. In an example embodiment, to obtain the secondary biometrics SB from a user touch, the electronic device 1000_4 may control the touch panel based on the first to third driving schemes described above.

Afterwards, in the case where the fingerprint matching operation and the anti-spoofing operation based on the fingerprint information FP and the secondary biometrics SB are successful, an electronic device 1000_5 may be unlocked or may display information indicating that user authentication is completed.

Alternatively, in the case where at least one of the fingerprint matching operation or the anti-spoofing operation fails, an electronic device 1000_6 may display information about authentication failure. For example, the above authentication scheme may be used in different operations requiring device unlock, financial payment, or authentication.

In an example embodiment, an application processor included in the electronic device may be configured to control an overall flow of the above authentication operation. Alternatively, components included in the electronic device may be configured to perform the above authentication operation without intervention of the application processor.

Figure 19:
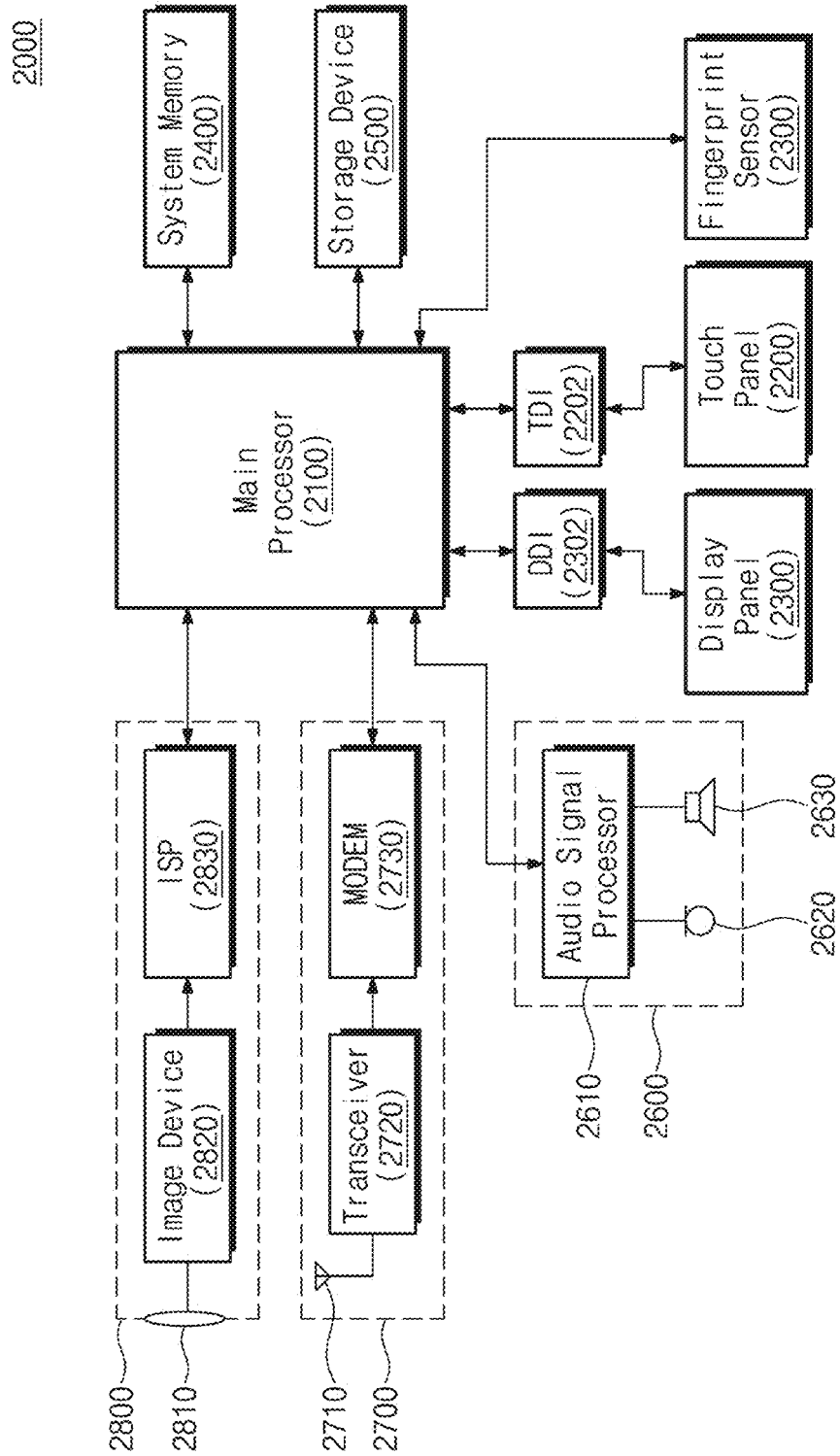
FIG. 19 is a conceptual diagram illustrating an example implementation of an electronic device according to an example embodiment of the inventive concepts.

FIG. 19 is a conceptual diagram illustrating an example implementation of an electronic device according to an example embodiment of the inventive concepts. Referring to FIG. 19, an electronic device 2000 may include a touch panel 2100, a touch driver 2102, a display panel 2200, a display driver 2202, a fingerprint sensor 2300, a system memory 2400, a storage device 2500, an audio processor 2600, a communication block 2700, an image processor 2800, and a main processor 2900. For example, the electronic device 2000 may be one of various electronic devices such as a portable communication terminal, a personal digital assistant (PDA), a portable media player (PMP), a digital camera, a smartphone, a tablet computer, a laptop computer, and a wearable device.

The touch panel 2100, the touch driver 2102, the display panel 2200, the display driver 2202, the fingerprint sensor 2300, and the main processor 2900 may respectively correspond to a touch panel, a touch driver, a display panel, a display driver, a fingerprint sensor, and an AP (or an authentication module) described with reference to FIGS. 1 to 18.

The fingerprint sensor 2300 may be disposed under the touch panel 2100 and/or the display panel 2200 to spatially correspond to a specific area on the touch panel 2100 and/or the display panel 2200. That is, the fingerprint sensor 230 may be implemented in the form of a fingerprint on display (FoD).

The buffer memory 2400 may store data that are used for an operation of the electronic device 2000. For example, the buffer memory 2400 may temporarily store data processed or to be processed by the main processor 2900. For example, the buffer memory 2400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The nonvolatile memory 2500 may store data regardless of whether a power is supplied. For example, the nonvolatile memory 2500 may include at least one of various nonvolatile memories such as a flash memory, a PRAM, an MRAM, a ReRAM, and a FRAM. For example, the nonvolatile memory 2500 may include an embedded memory and/or a removable memory of the electronic device 2000.

The image processor 2800 may receive a light through a lens 2810. An image device 2820 and an image signal processor 2830 included in the image processor 2800 may generate image information about an external object, based on the received light.

The communication block 2700 may exchange signals with an external device/system through an antenna 2710. A transceiver 2720 and a modulator/demodulator (MODEM) 2730 of the communication block 2700 may process signals exchanged with the external device/system, based on at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The audio processor 2600 may process an audio signal by using an audio signal processor 2610. The audio processor 2600 may receive an audio input through a microphone 2620 or may provide an audio output through a speaker 2630.

The main processor 2900 may control overall operations of the electronic device 2000. The main processor 2900 may control/manage operations of the components of the electronic device 2000. The main processor 2900 may process various operations for the purpose of operating the electronic device 2000.

According to the inventive concepts, in an anti-spoofing operation, an electronic device may reduce the probability of incorrect determination of the anti-spoofing operation by using indicator information to which information about a ground state of a user is applied, as well as a change of a capacitance due to a user fingerprint. Accordingly, an electronic device with improved reliability and an operation method thereof are provided.

While the inventive concepts has been described with reference to example embodiments thereof, it will be apparent to those of ordinary skill in the art that various changes and modifications may be made thereto without departing from the spirit and scope of the inventive concepts as set forth in the following claims.

What is claimed is:

1. An electronic device configured to perform fingerprint authentication, the electronic device comprising:
   a touch panel including a plurality of row touch lines and a plurality of column touch lines;
   a touch driver configured to control the plurality of row touch lines and the plurality of column touch lines to obtain secondary biometrics including touch profile information, first indicator information, and second indicator information associated with a fingerprint of a user, in response to the electronic device operating in a fingerprint sensing mode;
   a fingerprint sensor configured to obtain fingerprint information from the fingerprint of the user, in response to the electronic device operating in the fingerprint sensing mode; and
   processing circuitry configured to,
      perform a fingerprint matching operation and an anti-spoofing operation based on the fingerprint information and the secondary biometrics to output an authentication result, and
      perform a security operation based on the authentication result.

2. The electronic device of claim 1, wherein the touch driver is configured to obtain the secondary biometrics by,
   controlling the plurality of row touch lines and the plurality of column touch lines based on a first driving scheme to obtain the touch profile information,
   controlling the plurality of row touch lines and the plurality of column touch lines based on a second driving scheme to obtain the first indicator information, and controlling the plurality of row touch lines and the plurality of column touch lines based on a third driving scheme to obtain the second indicator information.

3. The electronic device of claim 2, wherein
the first driving scheme indicates a scheme in which signal changes of the plurality of column touch lines are sensed under a condition that (i) a first touch signal is provided to one of (a) the plurality of row touch lines or (b) the plurality of column touch lines and (ii) a voltage of a uniform level is provided to another one of (a) the plurality of row touch lines or (b) the plurality of column touch lines,
the second driving scheme indicates a scheme in which signal changes of the plurality of row touch lines and the plurality of column touch lines are sensed under a condition that the first touch signal is provided to both of the plurality of row touch lines and the plurality of column touch lines, and
the third driving scheme indicates a scheme in which signal changes of the plurality of row touch lines and the plurality of column touch lines are sensed under a condition that (i) the first touch signal is provided to the plurality of row touch lines and (ii) a second touch signal is provided to the plurality of column touch lines, the second touch signal being a reverse phase signal from the first touch signal.

4. The electronic device of claim 3, wherein,
the touch driver is configured to obtain the secondary biometrics such that, when a ground state of the user is same as a ground state of the electronic device, a difference between a value of the first indicator information and a value of the second indicator information is a first difference, and
the touch driver is configured to obtain the secondary biometrics such that, when the ground state of the user is different from the ground state of the electronic device, the difference between the value of the first indicator information and the value of the second indicator information is a second difference smaller than the first difference.

5. The electronic device of claim 2, wherein, in a normal mode of the electronic device, the touch driver is further configured to control the plurality of column touch lines and the plurality of row touch lines based on the first driving scheme and the second driving scheme to sense a touch input on the touch panel.

6. The electronic device of claim 1, wherein the processing circuitry is configured to,
perform the fingerprint matching operation based on the fingerprint information, and
perform the anti-spoofing operation based on the secondary biometrics.

7. The electronic device of claim 6, wherein the processing circuitry is configured to,
determine a ground state of the user based on the first indicator information and the second indicator information, and
determine whether the fingerprint of the user is faked, based on the ground state of the user and the touch profile information.

8. The electronic device of claim 1, wherein the processing circuitry is configured to,
perform a first machine learning operation on the fingerprint information based on a first machine learning model,
perform a second machine learning operation on the touch profile information based on a second machine learning model,
perform a third machine learning operation on the first indicator information and the second indicator information based on a third machine learning model, and
output the authentication result based on results of the first to third machine learning operations.

9. The electronic device of claim 1, further comprising:
a display panel including a plurality of pixels; and
a display driver configured to control the plurality of pixels based on instructions from the processing circuitry.

10. The electronic device of claim 9, wherein the fingerprint sensor is under the display panel in a shape of a fingerprint on display (FoD).

11. A method of operating an electronic device to perform fingerprint authentication, the method comprising:
controlling a plurality of row touch lines and a plurality of column touch lines to sense a touch of a user, in response to the electronic device operating in a normal mode;
obtaining fingerprint information from a fingerprint of the user, in response to the electronic device operating in a fingerprint sensing mode;
controlling the plurality of row touch lines and the plurality of column touch lines to obtain secondary biometrics including touch profile information, first indicator information, and second indicator information associated with the fingerprint of the user, in response to the electronic device operating in the fingerprint sensing mode;
performing a fingerprint matching operation and an anti-spoofing operation based on the fingerprint information, the touch profile information, the first indicator information, and the second indicator information to generate an authentication result, in response to the electronic device operating in the fingerprint sensing mode; and
performing a security operation based on the authentication result.

12. The method of claim 11, wherein the controlling of the plurality of row touch lines and the plurality of column touch lines to sense the touch of the user, in the normal mode, comprises:
controlling the plurality of row touch lines and the plurality of column touch lines based on a mutual-cap driving scheme to obtain first touch data;
controlling the plurality of row touch lines and the plurality of column touch lines based on a first self-cap driving scheme to obtain second touch data, the first self-cap driving scheme being a scheme in which a phase of a first touch signal provided to the plurality of row touch lines by a touch driver is same as a phase of a second touch signal provided by the touch driver to the plurality of column touch lines; and
sensing the touch of the user based on the first touch data and the second touch data.

13. The method of claim 12, wherein the controlling of the plurality of row touch lines and the plurality of column touch lines to obtain the secondary biometrics associated with the fingerprint of the user comprises:
controlling the plurality of row touch lines and the plurality of column touch lines based on the mutual-cap driving scheme to obtain the touch profile information;

controlling the plurality of row touch lines and the plurality of column touch lines based on the first self-cap driving scheme to obtain the first indicator information; and controlling the plurality of row touch lines and the plurality of column touch lines based on a second self-cap driving scheme to obtain the second indicator information, the second self-cap driving scheme being a scheme in which a phase of a third touch signal provided by the touch driver to the plurality of row touch lines is reverse to a phase of a fourth touch signal provided by the touch driver to the plurality of column touch lines.

14. The method of claim 13, wherein the performing of the fingerprint matching operation and the anti-spoofing operation comprises:

performing the fingerprint matching operation based on the fingerprint information; and performing the anti-spoofing operation based on the touch profile information, the first indicator information, and the second indicator information.

15. The method of claim 14, wherein the performing of the anti-spoofing operation comprises:

determining a ground state of the user based on the first indicator information and the second indicator information; and determining whether the fingerprint of the user is faked, based on the ground state of the user and the touch profile information.

16. The method of claim 13, wherein the performing of the fingerprint matching operation and the anti-spoofing operation comprises:

performing multimodal machine learning based on the fingerprint information, the touch profile information, the first indicator information, and the second indicator information to generate the authentication result.

17. An electronic device configured to perform fingerprint authentication, the electronic device comprising:

a touch panel including a plurality of touch lines extending along a row direction and a column direction;

a touch driver configured to, in response to the electronic device operating in a normal mode, control the plurality of touch lines based on a first driving scheme and a second driving scheme to sense a touch of a user, and in response to the electronic device operating in a fingerprint sensing mode, control the plurality of touch lines based on the first driving scheme to obtain touch profile information, control the plurality of touch lines based on the second driving scheme to obtain first indicator information, and control the plurality of touch lines based on a third driving scheme to obtain second indicator information;

a fingerprint sensor configured to obtain fingerprint information from the fingerprint of the user, in response to the electronic device operating in the fingerprint sensing mode; and an application processor configured to perform, a fingerprint matching operation and an anti-spoofing operation on the fingerprint information and secondary biometrics, and perform a security operation in response to results of the fingerprint matching operation and the anti-spoofing operation.

18. The electronic device of claim 17, wherein the first driving scheme indicates a scheme in which signal changes of first touch lines are sensed, under a condition that (i) a signal of a uniform level is provided to the first touch lines extending in one of the row direction and the column direction from among the plurality of touch lines, and (ii) a first touch signal is provided to second touch lines extending in another one of the row direction and the column direction from among the plurality of touch lines, the second driving scheme indicates a scheme in which signal changes of the plurality of touch lines are sensed under a condition that a second touch signal is provided to the plurality of touch lines extending in both of the row direction and the column direction, and the third driving scheme indicates a scheme in which signal changes of the plurality of touch lines are sensed under a condition that (i) a third touch signal is provided to the first touch lines and (ii) a fourth touch signal is provided to the second touch lines, the third and fourth touch signals being reverse phase signals.

19. The electronic device of claim 17, further comprising:

a display panel including a plurality of pixels; and a display driver configured to control the plurality of pixels based on instructions from the application processor, wherein the fingerprint sensor is under the display panel in a shape of a fingerprint on display (FoD).

20. The electronic device of claim 17, wherein the application processor is configured to perform the fingerprint matching operation and the anti-spoofing operation based on multimodal machine learning.

* * * * *